US008789222B2

(12) United States Patent
Blanchard et al.

(10) Patent No.: US 8,789,222 B2
(45) Date of Patent: Jul. 29, 2014

(54) PATIENT SUPPORT APPARATUS

(71) Applicant: Stryker Corporation, Kalamazoo, MI (US)

(72) Inventors: Frederick William Blanchard, Portage, MI (US); Jeffrey Joseph Thompson, Castle Rock, CO (US); Dennis John Wrobleski, Leonard, MI (US); Michael Sterling Smith, Hastings, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 13/857,199

(22) Filed: Apr. 5, 2013

(65) Prior Publication Data

US 2013/0219628 A1 Aug. 29, 2013

Related U.S. Application Data

(63) Continuation of application No. 11/260,452, filed on Oct. 27, 2005, now Pat. No. 8,413,271.

(60) Provisional application No. 60/623,653, filed on Oct. 29, 2004.

(51) Int. Cl.
*G05B 15/00* (2006.01)

(52) U.S. Cl.
USPC .................................................. 5/600; 5/173

(58) Field of Classification Search
USPC .................................................. 5/600, 173
See application file for complete search history.

(56) References Cited

U.S. PATENT DOCUMENTS

| | | | | |
|---|---|---|---|---|
| 4,998,939 A * | 3/1991 | Potthast et al. | 5/424 |
| 5,181,288 A * | 1/1993 | Heaton et al. | 5/607 |
| 5,559,301 A * | 9/1996 | Bryan et al. | 84/653 |
| 5,611,096 A * | 3/1997 | Bartlett et al. | 5/617 |
| 5,833,623 A * | 11/1998 | Mann et al. | 600/523 |
| 6,014,784 A * | 1/2000 | Taylor et al. | 5/713 |
| 6,119,291 A * | 9/2000 | Osborne et al. | 5/600 |
| 6,351,678 B1 * | 2/2002 | Borders | 700/83 |
| 6,487,735 B1 * | 12/2002 | Jacques et al. | 5/424 |
| 6,566,056 B1 * | 5/2003 | Boeke et al. | 435/6.14 |
| 7,038,588 B2 * | 5/2006 | Boone et al. | 340/573.1 |
| 7,081,091 B2 * | 7/2006 | Merrett et al. | 600/300 |

* cited by examiner

*Primary Examiner* — William Kelleher
(74) *Attorney, Agent, or Firm* — Warner Norcross & Judd LLP

(57) ABSTRACT

A patient support apparatus is provided. The patient support apparatus includes a plurality of therapeutic devices including a rotation device and a percussion-vibration device for carrying out rotation, percussion, and vibration therapy for a patient. The patient support apparatus includes a control system for controlling operation of the plurality of therapeutic devices. The control system comprises a touch-screen display segmented into a main menu portion and a data window portion. The therapeutic functions are represented by touch selectable buttons on the main menu portion. When any of these buttons are selected, a plurality of adjustable operating parameters appears in the data window portion. At the same time, the buttons corresponding to the therapeutic functions in the main menu portion remain visible such that an operator can easily select another therapeutic function. A method of tracking the therapeutic functions performed is provided. A rotation monitoring system and temperature control system of the patient support apparatus are provided. A display activation system is also provided.

14 Claims, 14 Drawing Sheets

PATIENT SUPPORT APPARATUS

This application is a continuation of U.S. patent application entitled PATIENT SUPPORT APPARATUS, Ser. No. 11/260,452, filed Oct. 27, 2005, which claims the benefit of U.S. patent application 60/623,653, filed Oct. 29, 2004, which are hereby incorporated by reference herein in their entireties.

FIELD OF THE INVENTION

The present invention relates to a patient support apparatus configured to provide multiple therapeutic functions. More specifically, the present invention relates to the patient support apparatus comprising a mattress having multiple therapeutic devices for carrying out the therapeutic functions and a main control system for controlling these therapeutic devices.

BACKGROUND OF THE INVENTION

Patient support systems are well known in the art for providing therapy to a patient. A typical patient support apparatus comprises a mattress having a plurality of air bladders for supporting the patient, a percussion device that alternates inflation and deflation of air bladders to provide percussion and vibration therapy to the patient, and a rotation device, usually positioned beneath the mattress, to rotate the patient from side to side. Percussion, vibration, and rotation therapy assist in reducing bed sores and pulmonary problems.

One example of such an apparatus is shown in U.S. Pat. No. 5,611,096 to Bartlett et al. Bartlett et al. discloses a patient support apparatus comprising a mattress having a percussion device with a plurality of selectively inflatable and deflatable air bladders to provide percussion therapy to a patient. Bartlett et al. also discloses an independent rotation device comprising two selectively inflatable and deflatable air bladders lying longitudinally beneath the mattress to provide rotation therapy to the patient. A controller including an operator input panel and display is used to control the percussion and rotation devices. The input panel includes a plurality of raised buttons for advancing through rotation and percussion functions and adjusting parameters associated with the rotation and percussion functions.

The prior art, however, fails to provide a mattress having multiple therapeutic devices for carrying out multiple therapeutic functions with a controller having a touch-screen display that is segmented into a main menu portion and a data window portion to easily select between the therapeutic functions. The prior art also fails to provide a touch-screen display that allows an operator to change a display language, to select between multiple alarm styles, or to quickly access a therapy history screen that recalls the therapies performed by the mattress in rolling 12-hour or 24-hour increments. In addition, the prior art fails to disclose a system for automatically activating a backlight of the touch-screen display as an operator approaches the touch-screen display.

Prior art patient support systems having multiple therapeutic devices are often used in conjunction with adjustable hospital bed frames. For instance, in U.S. Pat. No. 6,584,628 to Kummer et al., a hospital bed frame that is capable of being adjusted between a flat bed position and a chair position is used to support a mattress having a rotation device to provide rotation therapy to a patient. In Kummer et al., an angle sensor is attached to a foot end of the hospital bed frame to determine when the patient is adjusting the hospital bed frame to the chair position. In the event that rotation therapy is being conducted simultaneously, a controller automatically shuts down the rotation device to prevent injury to the patient.

The prior art, however, fails to provide an angle sensor supported by the mattress for determining an angle of a head end portion of the mattress relative to a horizontal reference. Furthermore, the prior art fails to disclose a control system that restricts rotation therapy to a predetermined moderate rotation angle when the head end portion is elevated to fall within a predetermined range.

The mechanisms used in percussion and rotation devices to carry out percussion, vibration, and rotation therapy typically include components such as AC or DC motors, pumps, solenoid valves, motor-controlled valves, electronic circuitry, and the like. As a result, heat builds-up in and around these devices, particularly when these devices are enclosed for purposes of safeguarding the devices from patients and hospital personnel. The prior art, however, fails to provide a patient support apparatus with a temperature control system for monitoring operating temperatures and adjusting operation of the therapy devices accordingly.

BRIEF SUMMARY OF THE INVENTION AND ADVANTAGES

The present invention provides a patient support apparatus comprising a mattress having a plurality of therapeutic devices for carrying out a plurality of therapeutic functions. A control system is in operative communication with the plurality of therapeutic devices to control the devices. The control system includes a touch-screen display segmented into a main menu portion and a data window portion. The main menu portion has at least one touch selectable button corresponding to each of the therapeutic functions and the data window portion displays at least one adjustable operating parameter for each of the therapeutic functions upon operator selection of the touch selectable buttons. The touch selectable buttons are continuously displayed on the touch-screen display before and after operator selection thereof such that an operator can easily select between each of the plurality of therapeutic functions, while simultaneously viewing the adjustable operating parameters for the selected functions. This touch-screen display configuration reduces the number of operations required to perform a specific therapeutic function, while also allowing an operator to quickly switch between functions.

The present invention also provides a backlight activation system. The activation system comprises at least one motion sensor positioned about the patient support apparatus near the touch-screen display to sense movement within an envelope surrounding the touch-screen display. The motion sensor transmits corresponding signals to the control system upon detecting movement, i.e., when the operator of the patient support apparatus approaches the touch-screen display or the patient support apparatus. When the control system receives the signal, a backlight of the touch-screen display, if then operating in a sleep mode, is awoken in an active mode. This configuration provides the operator quick access to the touch-screen display. In other words, the operator does not have to touch the touch-screen display in order to wake the touch-screen display, it is already activated and ready for operator selection. The activation system could easily be extended to other hospital systems for providing quick operator access including systems that have lighted displays with or without touch-screen capability.

The present invention also provides a method of tracking the therapeutic functions carried out by the patient support apparatus. The method includes logging operation of the therapeutic functions in a retrievable electronic storage format and displaying the logged operation of the therapeutic functions in predetermined time increments such as rolling 12-hour and 24-hour increments.

The present invention also provides a rotation monitoring system. The rotation monitoring system comprises an angle sensor that is responsive to adjustment of a head end portion of the mattress between a plurality of angular positions relative to a horizontal reference. A rotation device is disposed in the mattress for providing rotation therapy to a patient. The control system is in operative communication with the angle sensor and the rotation device. The control system is configured, e.g., programmed, for determining the angular position of the head end portion relative to the horizontal reference and restricting the rotation device to rotating the patient through a predetermined moderate rotation angle range in response to the angular position falling within a predetermined range. The controller is also configured to restrict operation of the rotation device completely when the angular position of the head end portion exceeds an upper limit of the predetermined range. The angle sensor could also be used to control other functions of the patient support apparatus, such as firmness of the patient support apparatus.

The present invention further provides a temperature control system for the mattress. The temperature control system comprises at least one temperature sensor in thermal communication with at least one device for measuring an operating temperature. The control system is in operative communication with the device and the temperature sensor for determining the operating temperature and comparing the operating temperature to a predetermined value. The control system is configured for modifying operation of the at least one device when the operating temperature exceeds the predetermined value.

BRIEF DESCRIPTION OF THE SEVERAL VIEWS OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

Referring to the Figures, wherein like numerals indicate like or corresponding parts throughout the several views, a patient support apparatus of the present invention is generally shown at 10.

Figure 1:
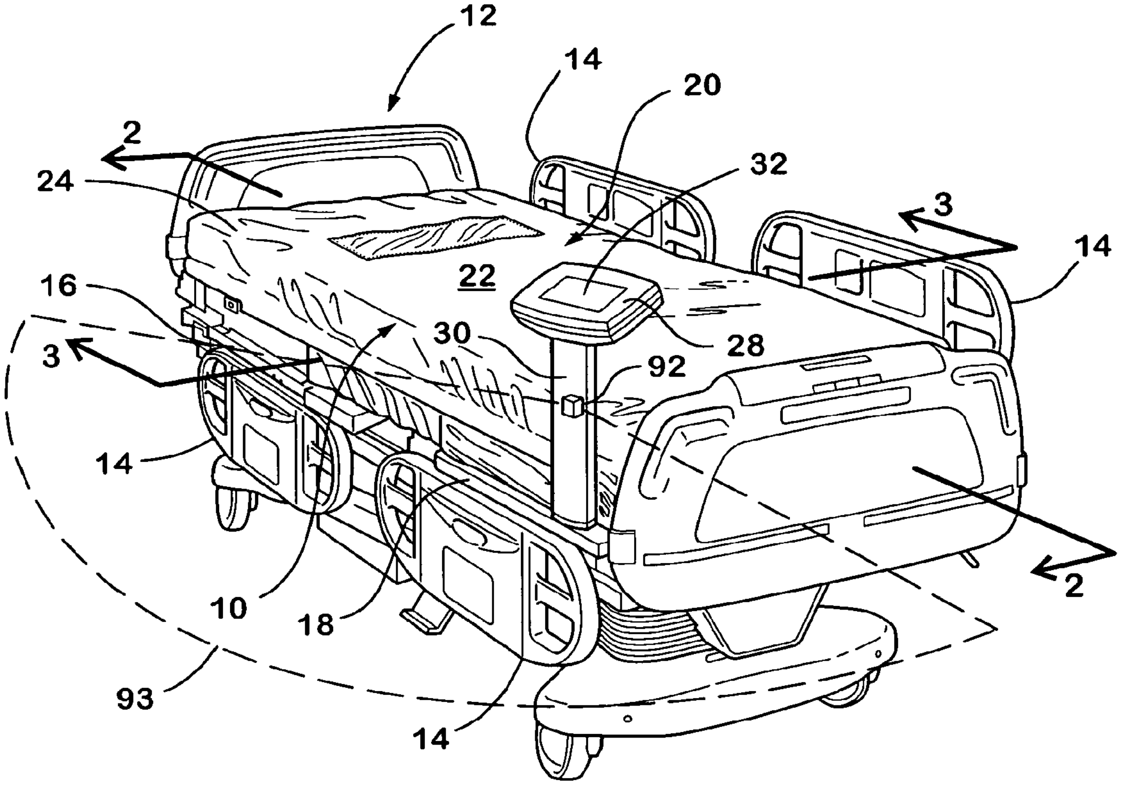
FIG. 1 is a perspective view of a patient support apparatus of the present invention positioned on a hospital bed frame.

Referring to FIG. 1, the patient support apparatus 10 of the present invention is shown in combination with a mobile hospital bed frame 12. As illustrated, the hospital bed frame 12 typically includes a plurality of side rails 14 that can be lowered for patient transfer and raised to confine a patient. The hospital bed frame 12 can also include a plurality of adjustable sections including an adjustable head section 16 that is pivotally adjustable relative to a main body section 18 of the bed frame 12 to allow the patient to sit up while eating or visiting with family.

Still referring to FIG. 1, the patient support apparatus 10 comprises a self-contained mattress 20 having a patient support surface 22. The mattress 20 is referred to as being self-contained since most of the working components of the mattress 20 that are used to carry out multiple functions of the mattress 20, including a plurality of therapeutic functions, are enclosed by a cover 24 of the mattress 20. The cover 24 can be any conventional material including, but not limited to natural fibers, polymeric materials, or combinations thereof. The cover 24 is preferably a vapor permeable material to be used in conjunction with a low air loss mechanism 26 described below.

A pendant 28 is supported by a tower 30 coupled to the mattress 20. The pendant 28 includes a touch-screen display 32 used to operate many of the functions of the mattress 20, as described further below. Touch-screen displays 32 are well known to those skilled in the art for operator input, as well as output, based upon the particular software used to configure the touch-screen display 32. Here, the touch-screen display 32 has input and output capabilities.

Figure 2:
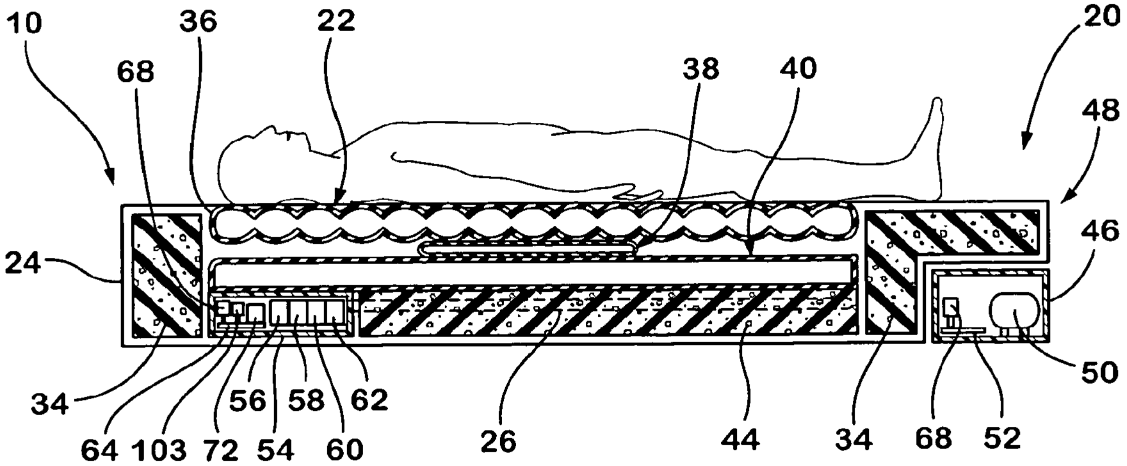
FIG. 2 is a cross-sectional view of the patient support apparatus taken along the line 2-2 in FIG. 1.
Figure 3:
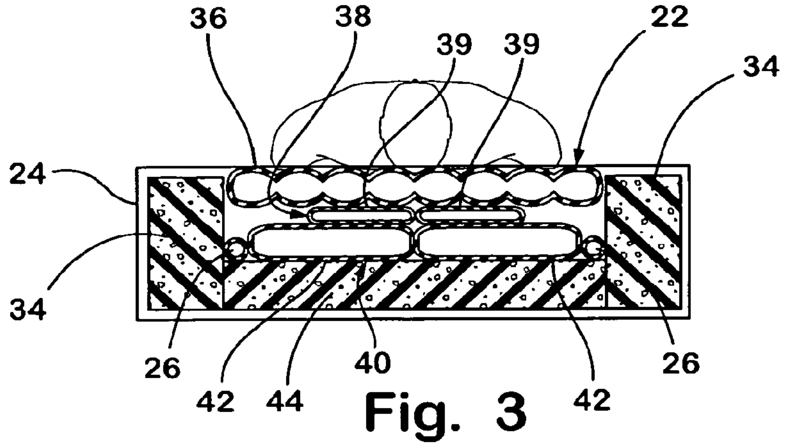
FIG. 3 is a cross-sectional view of the patient support apparatus taken along the line 3-3 in FIG. 1.

Referring to FIGS. 2 and 3, longitudinal and transverse cross-sections of the mattress 20 are shown. As illustrated, the mattress 20 is supported by a frame 34 of a conventional bedding frame material. Such material can include, but is not limited to foam, polymeric materials, metal, gels, or combinations thereof. A main air bladder 36 is positioned within the perimeter of the frame 34 and immediately below an upper portion of the cover 24. The main air bladder 36 acts as the primary support for the patient.

A percussion-vibration mechanism 38 is positioned below the main air bladder 36, hereinafter referred to as the percussion mechanism 38. The percussion mechanism 38 provides both percussion and vibration therapy to the patient. The particular therapy being employed is dependent on the frequency or the number of beats per second generated by the percussion mechanism 38. For example, and not to be limited to these examples, the percussion therapy usually employs 1-7 beats per second and the vibration therapy employs 7 to 25 beats per second. The percussion mechanism 38 may employ mechanical fingers or rollers to impart the percussion motion, but preferably comprises a pair of inflatable percussion bladders 39, best shown in FIG. 3, having fingerlike cells that oscillate between inflated and deflated states to provide the percussive movement required. Such a mechanism is illustrated in U.S. Patent Application Publication No. 2004/0193078 to Flick et al., hereby incorporated by reference in its entirety. The '078 publication shall be referred to often throughout the description.

A rotation mechanism 40 is positioned below the percussion mechanism 38. The rotation mechanism 40 provides rotation therapy to the patient by rotating the patient from side to side. Along with percussion and vibration therapy, rotation therapy assists in reducing bed sores and pulmonary problems of the patient. The rotation mechanism 40 is preferably a pair of longitudinally positioned rotation bladders 42, shown in FIG. 3 and described in the '078 publication to Flick et al. The rotation bladders 42 are independently inflated and deflated to raise one side of the patient, lower the patient, and then raise the other side of the patient such that the patient experiences a side-to-side rotation that shifts pressures between the patient and the mattress 20. This motion is illustrated in FIGS. 6B and 6C.

The low air loss mechanism 26 is preferably positioned within the cover 24. The low air loss mechanism 26 is used in conjunction with the cover 24. In operation, air is pumped from the low air loss mechanism 26 through the permeable cover 24 to reduce the temperature below the patient support surface 22 and decrease the chance of skin maceration which lowers the risk of bed sores. The low air loss mechanism 26 preferably comprises perforated tubing that is disposed within the frame 34 under the cover 24 and external to the main air bladder 36, the percussion mechanism 38, and the rotation mechanism 40.

The main air bladder 36, percussion mechanism 38, and rotation mechanism 40 are supported within the cover 24 of the mattress 20 by a base cushion 44 positioned within a perimeter of the frame 34. The base cushion 44 can be rigid or flexible and comprise an air bladder, or simply be constructed of conventional bedding materials such as foam, and the like.

Referring specifically to FIG. 2, a first control unit 46 in the form of a rigid box is shown at a foot end 48 of the mattress 20. The first control unit 46 encloses a main pump 50 and a power circuit board 52 for operating the main pump 50 and transferring power to the rest of the mattress components. As shown, the first control unit 46 fits neatly below the foot end 48 of the mattress 20, but is not incorporated within the cover 24 of the mattress 20. In a preferred embodiment, the main pump 50 is used to inflate the main air bladder 36, the percussion bladders 39, and the rotation bladders 42, and to convey air to the perforated tube 26. Other configurations of the first control unit 46 inside the cover 24 are also possible. Such configurations are illustrated in the '078 publication to Flick et al. Another configuration is also disclosed in U.S. Pat. No. 5,325,551 to Tappel et al. hereby incorporated by reference.

A second control unit 54 in the form of a rigid box is shown beneath the cover 24 of the mattress 20 within the perimeter of the frame 34. The second control unit 54 encloses a low air loss control system 56 for controlling the low air loss mechanism 26, a main valve system 58 for inflating and deflating the main air bladder 36, a percussion control system 60 for controlling the percussion mechanism 38, a rotation control system 62 for controlling the rotation mechanism 40, and a main circuit board 64 in operative communication with these systems and the power circuit board 52. The second control unit 54 also encloses a controller 72 for controlling operation of these systems 56, 58, 60, 62 and the main pump 50. These systems 56, 58, 60, 62 may comprise motors, solenoid valves, and/or motor-controlled valves, as disclosed in the '078 publication. It should be appreciated that each of these separate control systems 56, 58, 60, 62 may also represent portions of a larger system. Those skilled in the art will recognize that the systems employed for controlling operation of the loss air loss mechanism 26, main air bladder 36, percussion mechanism 38, and rotation mechanism 40 may assume a number of configurations, and the specific configurations employed are not intended to limit the present invention. In addition, these systems may also be employed for controlling fluid motion other than air, such as water, gel, and the like to carry out the therapeutic functions of the mattress 20.

Still referring to FIG. 2, a temperature control system comprises temperature sensors 68 that are placed on the circuit boards 52, 64 located in each of the control units 46, 54. These temperature sensors 68 are in thermal communication with the control units 46, 54 and transmit signals back to the controller 72 corresponding to operating temperatures associated with each of the control units 46, 54. The main pump 50, power circuit board 52, systems 56, 58, 60, 62, main circuit board 64, and/or controller 72 may raise temperatures within their respective units 46, 54. Thus, the temperatures in these units 46, 54 are continuously monitored and electronically recorded in a maintenance log. Should the temperature in either control unit 46 or 54 exceed a predetermined threshold, such as a temperature in the range of 110 to 150 degrees Fahrenheit, more preferably 122 degrees Fahrenheit, the controller 72 may act to shut down currently operating systems of the patient support apparatus 10 for a predetermined time period, e.g., 30 minutes or longer. The controller 72 may shut down the main pump 50, low air loss control system 56, main valve system 58, percussion control system 60, rotation control system 62, or any combination thereof. When the temperature inside either of the control units 46, 54 exceeds the predetermined threshold a second time, the controller 72 shuts down all systems, except for the touch-screen display 32, and requires immediate maintenance attention before restarting.

Figure 4:
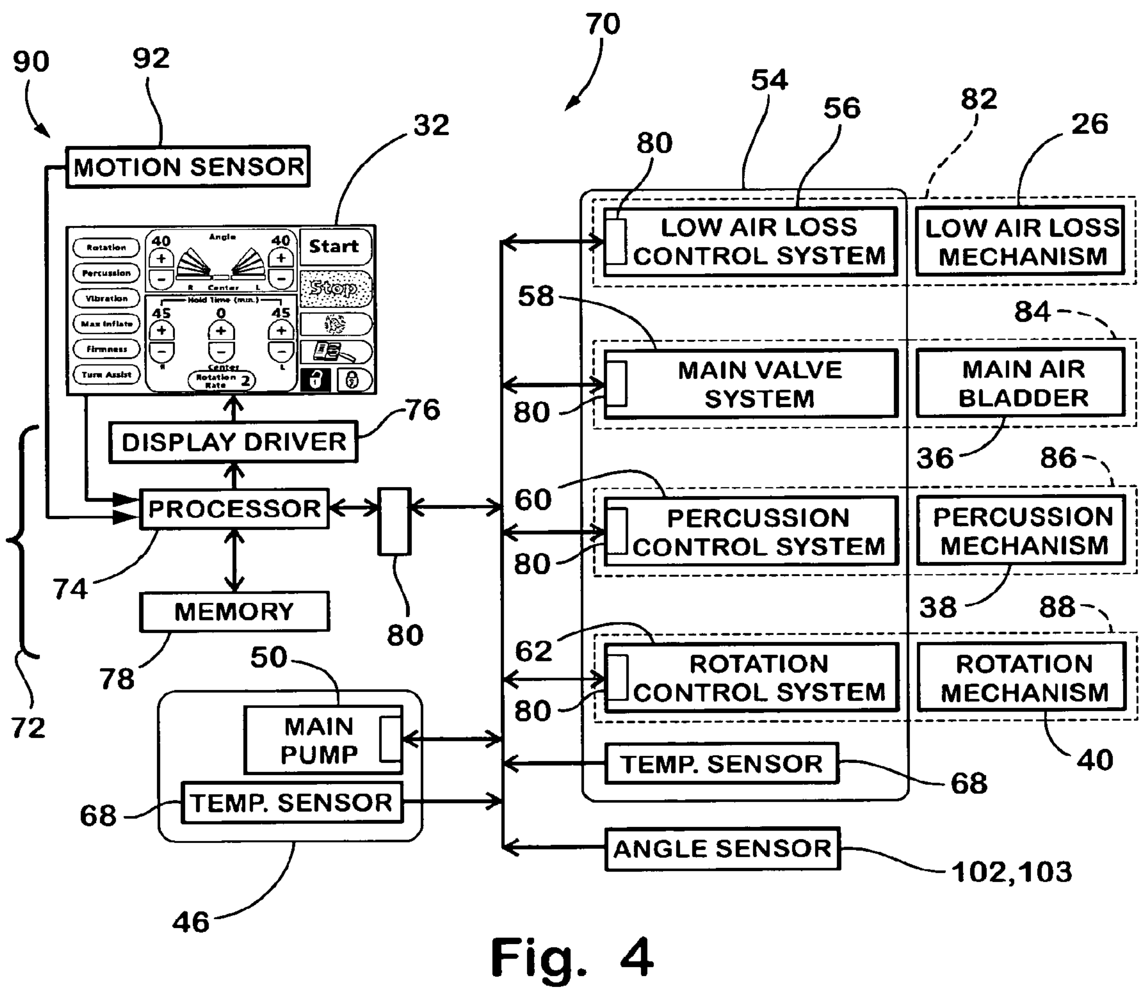
FIG. 4 is a schematic view of a control system of the patient support apparatus.

Referring to FIG. 4, a main control system 70 of the patient support apparatus 10 is schematically illustrated. The main control system 70 includes the touch-screen display 32, the controller 72 which comprises a processor 74, a display driver 76 for driving the touch-screen display 32, memory 78, and a communication interface 80. The controller 72, via communication interfaces 80, is also in operative communication with the low air loss control system 56, main valve system 58, percussion control system 60, rotation control system 62, and the main pump 50. FIG. 4 essentially illustrates the use of the controller 72 to control operation of the main pump 50, a low air loss device 82 (comprises the low air loss control system 56 and the low air loss mechanism 26), a firmness setting device 84 (comprises the main valve system 58 and the main air bladder 36), a percussion device 86 (comprises the percussion control system 60 and the percussion mechanism 38), and a rotation device 88 (comprises the rotation control system 62 and the rotation mechanism 40).

The touch-screen display 32 includes a limited-life backlight that is often placed in a sleep mode. In particular, the backlight is shutdown after 30 minutes during non-use, but remains active during use and during selected therapeutic functions, such as rotation, to monitor rotation therapy. As shown in FIG. 4, a display activation system 90 is provided. The activation system 90 comprises a motion sensor 92, or multiple motion sensors, positioned about the patient support apparatus 10 or near the touch-screen display 32 to sense movement within an envelope 93 (see FIG. 1) surrounding the touch-screen display 32. These motion sensors 92 transmit corresponding signals to the processor 74 upon detecting movement, i.e., when the operator of the patient support apparatus 10 approaches the touch-screen display 32. When the processor 74 receives these signals, the backlight, if then operating in the sleep mode, is awoken in an active mode. This configuration provides the operator quick access to the touch-screen display 32. In other words, the operator does not have to touch the touch-screen display 32 in order to wake the touch-screen display 32, it is already activated and ready for operator selection. The activation system 90 could easily be extended to other hospital systems for providing quick operator access including systems that have lighted displays with or without touch-screen capability.

Figure 5:
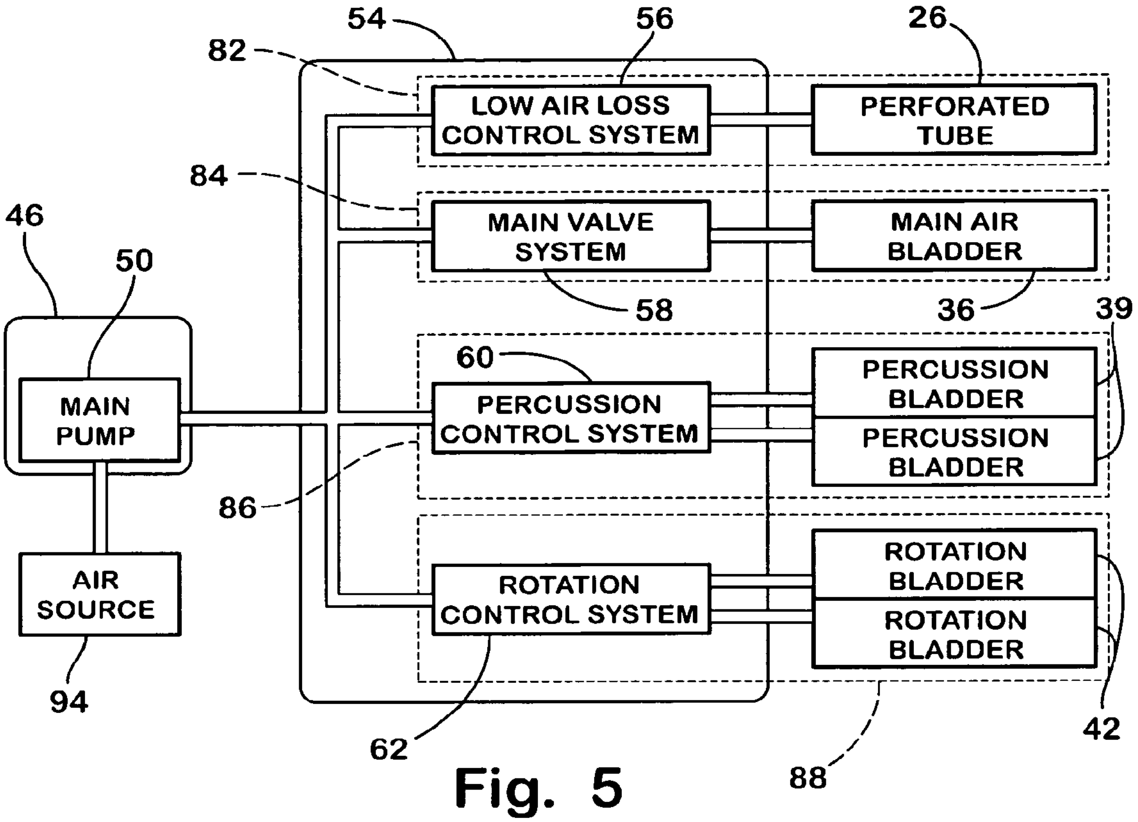
FIG. 5 is a schematic view of a fluid flow system of the present invention.

Referring to FIG. 5, a fluid flow schematic of the patient support apparatus 10 is shown. The fluid flow schematic generally shows the movement of air through fluid conduits from an air source 94 (preferably outside air) via the main pump 50 to the second control unit 54 and more specifically, to the low air loss control system 56, the main valve system 58, the percussion control system 60, and the rotation control system 62. Each of these systems 56, 58, 60, 62 preferably comprises valve controls for operating their respective mechanisms, i.e., the perforated tube 26, the main air bladder 36, the percussion bladders 39, and the rotation bladders 42. Such valve controls are described in more detail in the '078 publication to Flick et al. herein incorporated by reference. It should be appreciated that each of the separate control systems 56, 58, 60, 62 may be portions of a larger valve system, or the control systems 56, 58, 60, 62 may represent direct connections between the main pump 50 and the respective perforated tube 26 or bladders 36, 39, 42.

Figure 6A:
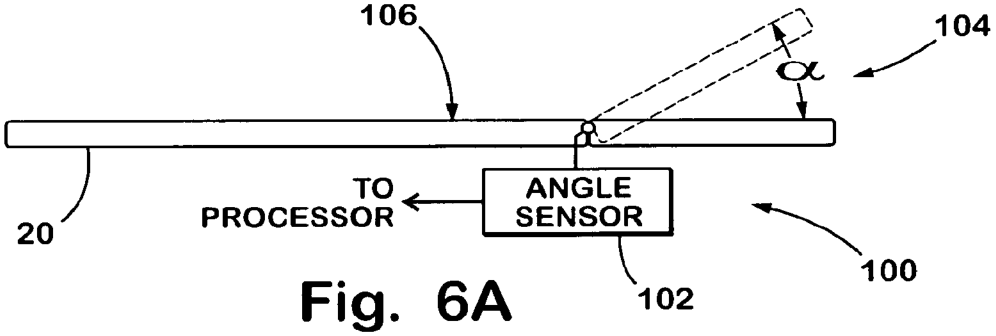
FIG. 6A is a schematic view of a rotation control system.
Figure 6B:
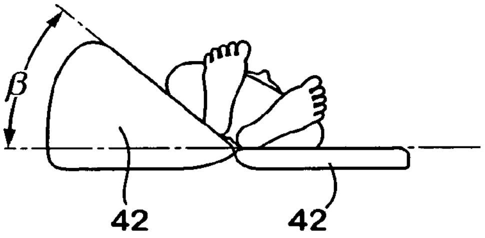
FIG. 6B illustrates a rotation mechanism of the patient support apparatus in a left side rotated position.
Figure 6C:
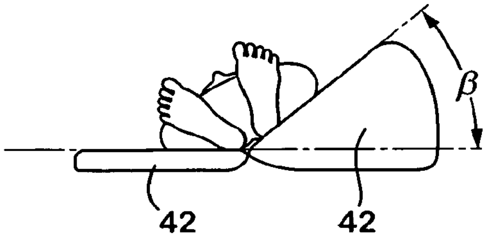
FIG. 6C illustrates the rotation mechanism of FIG. 6B in a right side rotated position.

Referring to FIGS. 6A-6C, one embodiment of a rotation monitoring system 100 is shown. The rotation monitoring system 100 comprises an angle sensor 102 for acting between a head end portion 104 of the mattress 20 and a main body portion 106 of the mattress 20. When the mattress 20 is positioned on a hospital bed frame 12, as shown in FIG. 1, and the adjustable head section 16 of the hospital bed frame 12 is adjusted to elevate the patient's head and torso, the head end portion 104 of the mattress 20 is simultaneously adjusted between a plurality of angular positions .alpha. relative to a horizontal reference passing through the main body portion 106. The angle sensor 102 transmits a signal to the controller 72 corresponding to the angular position. Referring to FIGS. 6B-6C, this feature is important during rotation therapy. In the main control system 70 of the present invention, rotation therapy is restricted when the angular position .alpha. of the head end portion 104 is within a predetermined range, e.g., 30 to 60 degrees. In particular, in this instance, the left and right side rotation angles .beta. are restricted to a predetermined moderate rotation range. The moderate rotation range may be from 15 to 25 degrees, most preferably 20 degrees. When the angular position .alpha. of the head end portion 104 exceeds an upper limit of the predetermined range, e.g., 60 degrees, rotation therapy is inoperative altogether. Thus, rotation therapy, which includes rotating the patient from side-to-side through left and right side rotation angles .beta. of 40 degrees or more, is restricted to rotating the patient through left and right side rotation angles .beta. of 15 to 25 degrees when the head end portion 104 of the mattress 20 is elevated to an angular position of 30 to 60 degrees, and is inoperative when the angular position exceeds 60 degrees. In other embodiments, the angle sensor 102 can be used to control firmness of the mattress 20, e.g., at an angular position above 10 degrees, the mattress firmness is reduced.

Referring back to FIG. 2 for a moment, an alternative angle sensor 103 for use in the rotation monitoring system 100 is shown. In this embodiment, the angle sensor 103 is coupled to the main circuit board 64 in the second control unit 54. This angle sensor 103, which may be in the form of a tilt sensor, reacts to changes in elevation of the head end portion 104 of the mattress 20 relative to a horizontal reference, as opposed to acting between the head end portion 104 and the main body portion 106, as in the previous embodiment. Otherwise, however, the controller 72 uses the angle sensor 103 in the same fashion as the previous embodiment to control rotation therapy.

The functions of the patient support apparatus 10 are controlled by the main control system 70 through the touch-screen display 32 that is disposed on the pendant 28. As will be appreciated by those skilled in the art, control and display software have been configured into the controller 72 to provide this functionality.

Figure 7:
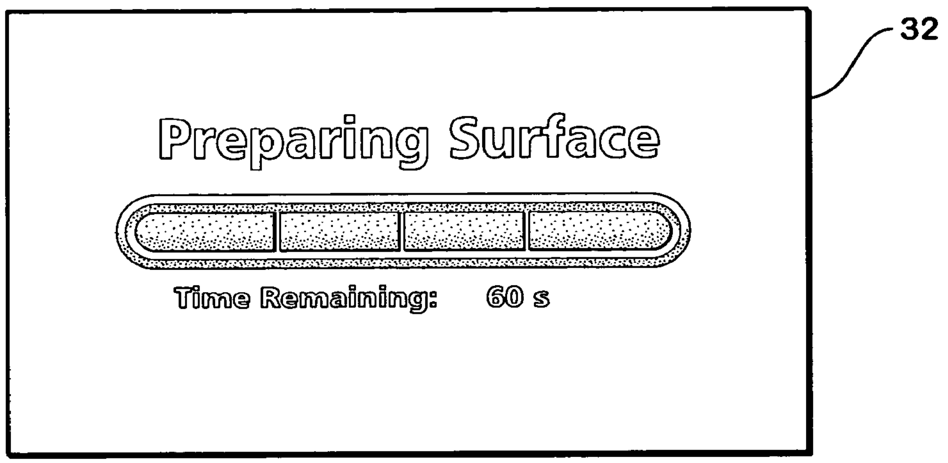
FIG. 7 is a view of a touch-screen display illustrating a start-up function of the patient support apparatus.
Figure 8:
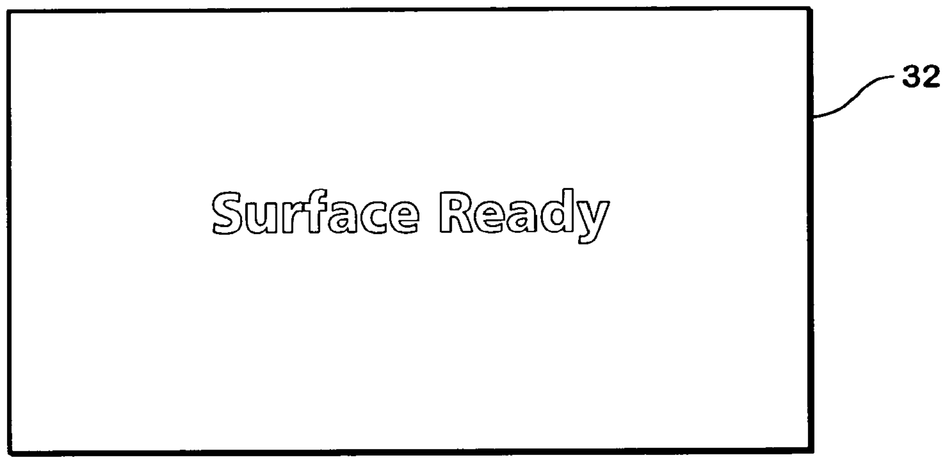
FIG. 8 is a view of the touch-screen display illustrating a visual indicator representing completion of the start-up function of FIG. 7.

FIGS. 7 and 8 show the touch-screen display 32 visually indicating start-up operation of the patient support apparatus 10. As shown, at start-up, the main air bladder 36 is inflated to a predetermined maximum pressure to ready the patient support surface 22 of the mattress 20.

Figure 9:
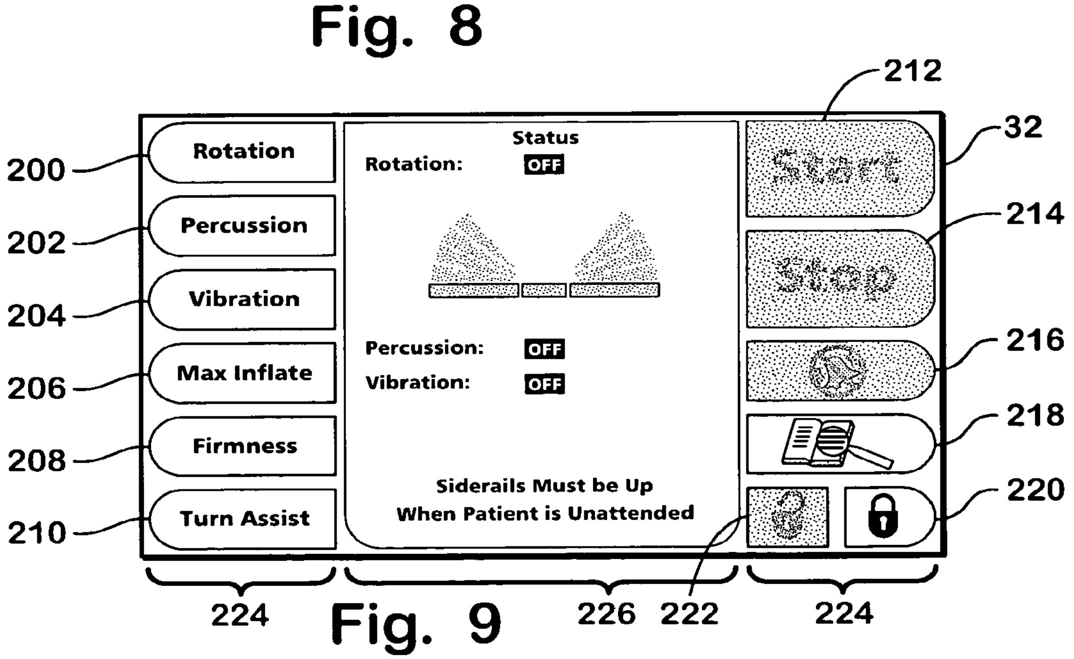
FIG. 9 is a view of the touch-screen display illustrating multiple functions and displaying a status of therapeutic functions.

FIG. 9 shows the touch-screen display 32 in its normal non-operative mode. As shown, a plurality of therapeutic functions including "Rotation", "Percussion", and "Vibration" functions are controlled through the touch-screen display 32 via touch selectable buttons 200, 202, 204. In addition, other functions such as a maximum inflation function ("Max Inflate") in which the main air bladder 36 is inflated to a predetermined maximum pressure, a firmness function ("Firmness") which is used to adjust a firmness or pressure of the main air bladder 36, and a patient turning function ("Turn Assist") which is a nursing function that allows the nurse to disrupt any current therapeutic function and rotate the patient to a desired position for administering medication, placing IVs, and the like, are also selectable via touch selectable buttons 206, 208, 210. The touch-screen display 32 could also be configured to control other functions and are not limited to those functions detailed herein.

The touch-screen display 32 also includes a touch selectable start button 212 for starting any of the therapeutic functions and a touch selectable stop button 214 for stopping any of the therapeutic functions or the patient turning function. Finally, the touch-screen display 32 includes a touch selectable alarm silence button 216 that can be actuated to stop any sounding alarms, a touch selectable advanced menu button 218 to access advanced functions described later, and touch selectable lock 220 and unlock 222 buttons used to lock and unlock access to the functions on the touch-screen display 32. Each of the touch selectable buttons 200-222 used to initiate the various functions is included in a main menu portion 224 of the touch-screen display 32. The main menu portion 224 is segmented from and surrounds a data window portion 226. In FIG. 9, the data window portion 226 visually indicates the current status of each of the therapeutic functions, e.g., "off".

Figure 10:
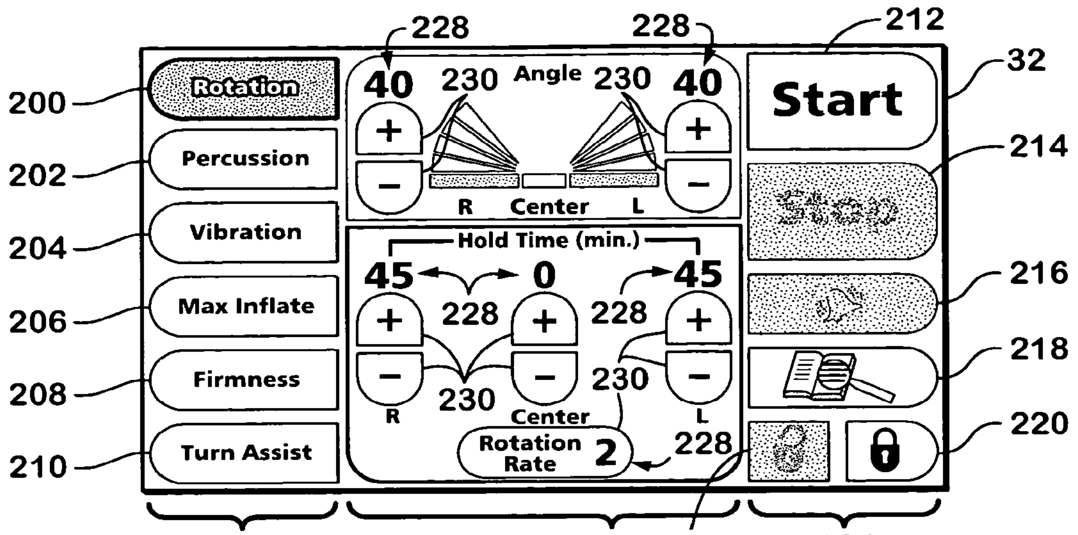
FIG. 10 is a view of the touch-screen display illustrating multiple functions and displaying adjustable operating parameters of a rotation function.

FIG. 10 shows the touch-screen display 32 after selecting the rotation button 200. As shown, by selecting the rotation button 200, the data window portion 226 now displays a plurality of adjustable operating parameters 228 that correspond to the rotation function. These include a right side rotation angle, a left side rotation angle, a right side hold time, a left side hold time, a center hold time, and a total rotation time or "Rotation Rate", e.g., minutes per full rotation cycle. The operator can adjust each of these parameters 228 to customize the rotation therapy for the patient using touch selectable adjustment buttons 230. Note that in FIG. 10 the buttons 200-222 of the main menu portion 224 are still visible even though the rotation button 200 has been selected. This configuration provides a "flat architecture" to the touch-screen display 32. In other words, the buttons of the main menu portion 224 are continuously displayed on the touch-screen display 32 before and after operator selection of one of the functions such that the operator can easily select between each of the functions.

Figure 11:
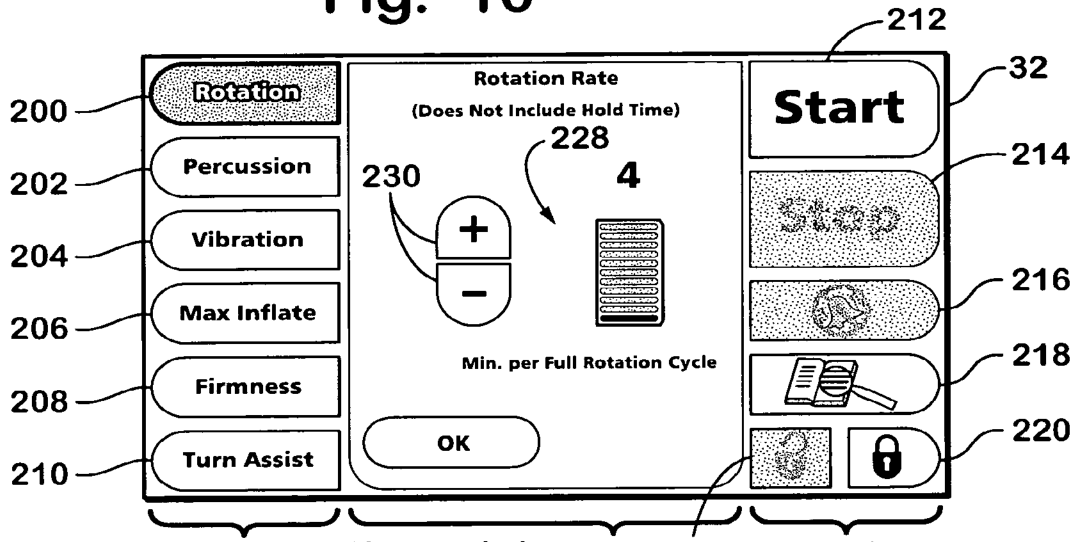
FIG. 11 is a view of the touch-screen display illustrating multiple functions and displaying another adjustable operating parameter of the rotation function.

FIG. 11 shows the touch-screen display 32 after selecting the "Rotation Rate" button to adjust the total rotation time.

Figure 12:
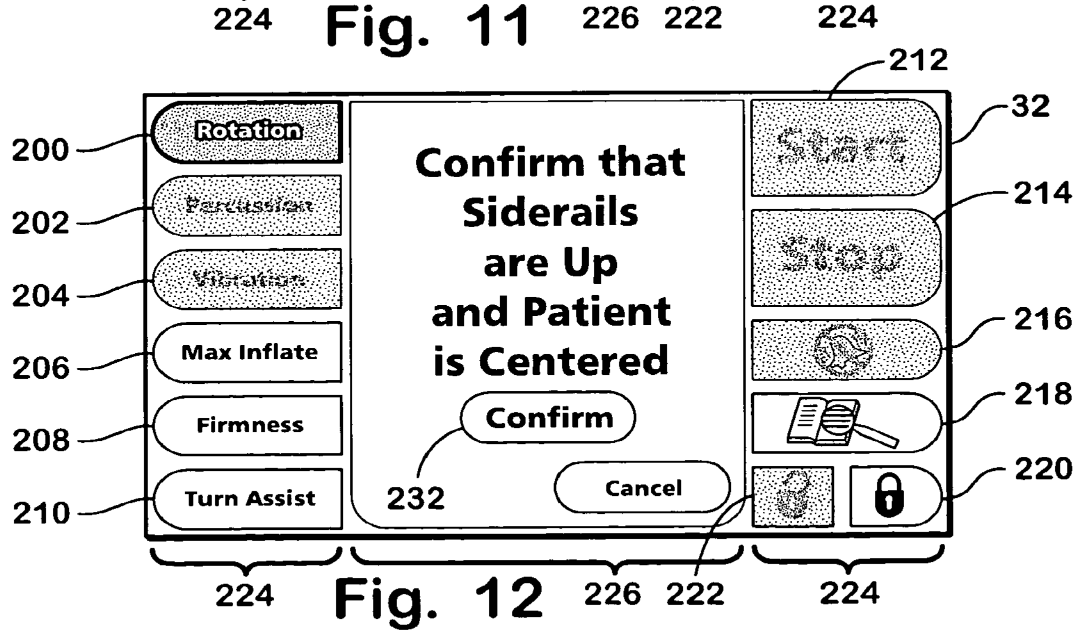
FIG. 12 is a view of the touch-screen display illustrating multiple functions and displaying a warning message corresponding to a required condition with selectable confirmation that the condition is met.

FIG. 12 shows the touch-screen display 32, after all of the adjustable operating parameters 228 that correspond to the rotation function have been set, and after the start button 212 has been selected. In this case, the display software prompts the operator to "Confirm" that the side rails 14 of the hospital bed frame 12 are up and that the patient is properly centered on the patient support surface 22 before beginning the rotation therapy. Once confirmed, by selecting corresponding touch selectable button 232, the main control system 70 instructs the rotation device 88 to provide the rotation therapy as prescribed.

Figure 13:
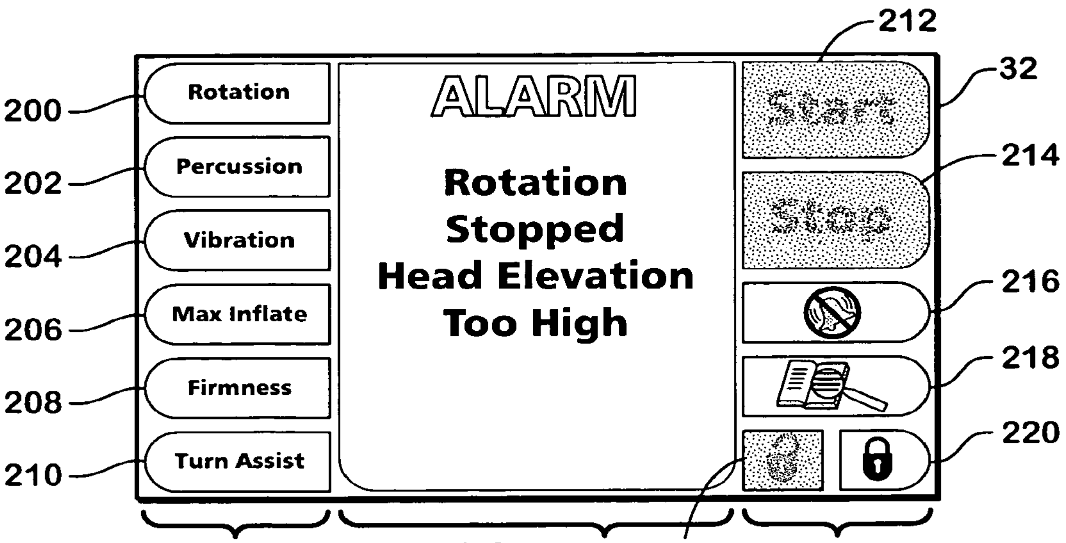
FIG. 13 is a view of the touch-screen display illustrating multiple functions and displaying a warning message and associated alarm indicating that a head end portion of the patient support apparatus is beyond a predetermined angle or elevation.

FIG. 13 shows the touch-screen display 32 after the operator confirms that the side rails 14 are up and the patient is properly centered, but the head end portion 104 of the mattress 20 exceeds the upper limit of the predetermined range of angular positions, e.g., the head end portion 104 has been elevated beyond 60 degrees. As shown, a visual indicator provides a visual alarm, while an audible alarm is also activated. This same display is shown after rotation therapy has started and the head end portion 104 is subsequently raised beyond the upper limit. This is merely exemplary of the visual and audible alarm provided by the rotation monitoring system 100. The alarm could assume other forms.

Figure 14:
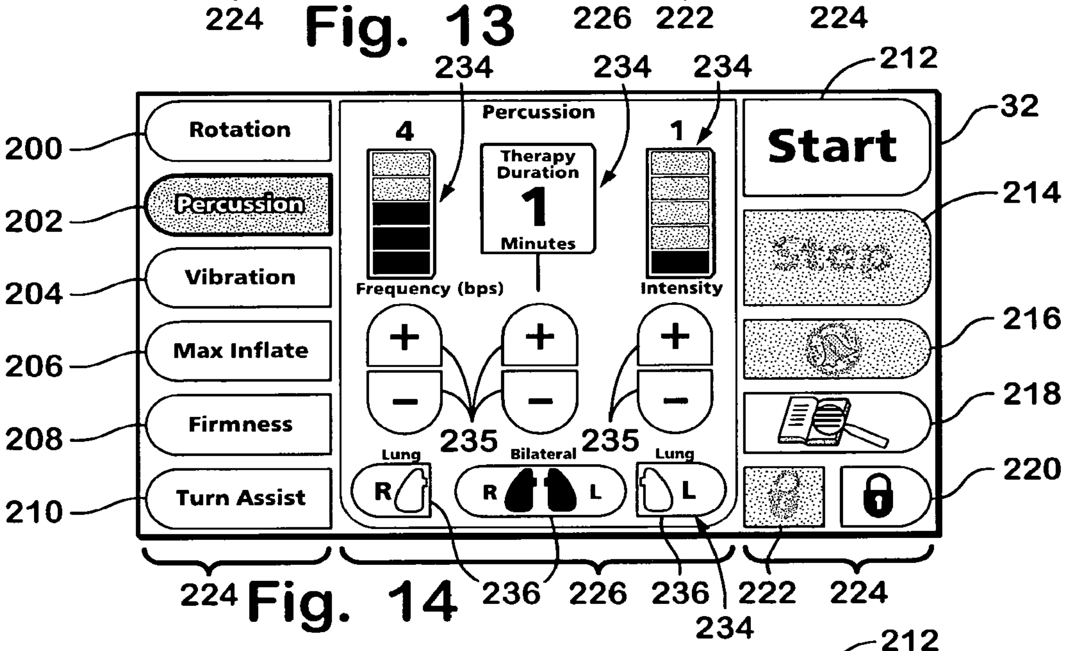
FIG. 14 is a view of the touch-screen display illustrating multiple functions and displaying adjustable operating parameters of a percussion function.

FIG. 14 shows the touch-screen display 32 after selecting the percussion button 202. As shown, by selecting the percussion button 202, the data window portion 226 now displays a plurality of adjustable operating parameters 234 that correspond to the percussion function. These include an intensity level, a frequency (beats per second), a total vibration time, and an application zone. The operator can adjust each of these parameters 234 to customize the percussion therapy for the patient using the touch selectable adjustment buttons 235. The application zone refers to zones on the patient for which therapy is intended. In FIG. 14, three zones are selectable for therapy, a right zone, indicated by a right lung icon, a left zone, indicated by a left lung icon, and a combination of the left and right zones, indicated by a "bilateral" or right and left lung icon. By highlighting one of these icons, the percussion therapy is prescribed for only that zone. In the preferred embodiment, if the left or right lungs are selected, only a left or right side of the percussion mechanism 38 operates, where the entire percussion mechanism 38 operates if the bilateral mode is selected. Again note that in FIG. 14 the buttons 200-222 of the main menu portion 224 are still visible even though the percussion button 202 has been selected. Once the adjustable operating parameters 234 are set, the main control system 70 instructs the percussion device 86 to provide percussion therapy as prescribed.

Figure 15:
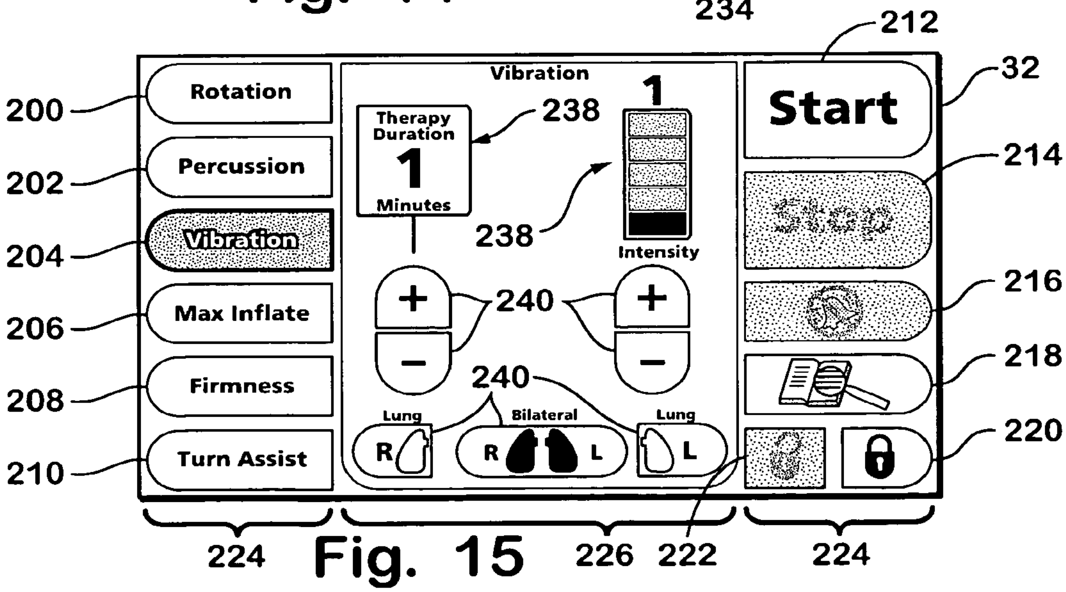
FIG. 15 is a view of the touch-screen display illustrating multiple functions and displaying adjustable operating parameters of a vibration function.

FIG. 15 shows the touch-screen display 32 after selecting the vibration button 204. As shown, by selecting the vibration button 204, the data window portion 226 now displays a plurality of adjustable operating parameters 238 that correspond to the vibration function. These include an intensity level, a total vibration time, and an application zone. The operator can adjust each of these parameters 238 to customize the vibration therapy for the patient using touch selectable adjustment buttons 240. The application zone refers to the zones on the patient for which therapy is intended. In FIG. 15, three zones similar to those for percussion therapy are selectable for vibration therapy. Again note that in FIG. 15 the buttons 200-222 of the main menu portion 224 are still visible even though the vibration button 204 has been selected. Once the adjustable operating parameters 238 are set, the main control system 70 instructs the percussion device 86 to provide vibration therapy as prescribed (the percussion device 86 is used for both percussion therapy and vibration therapy, but at different frequencies).

Figure 16:
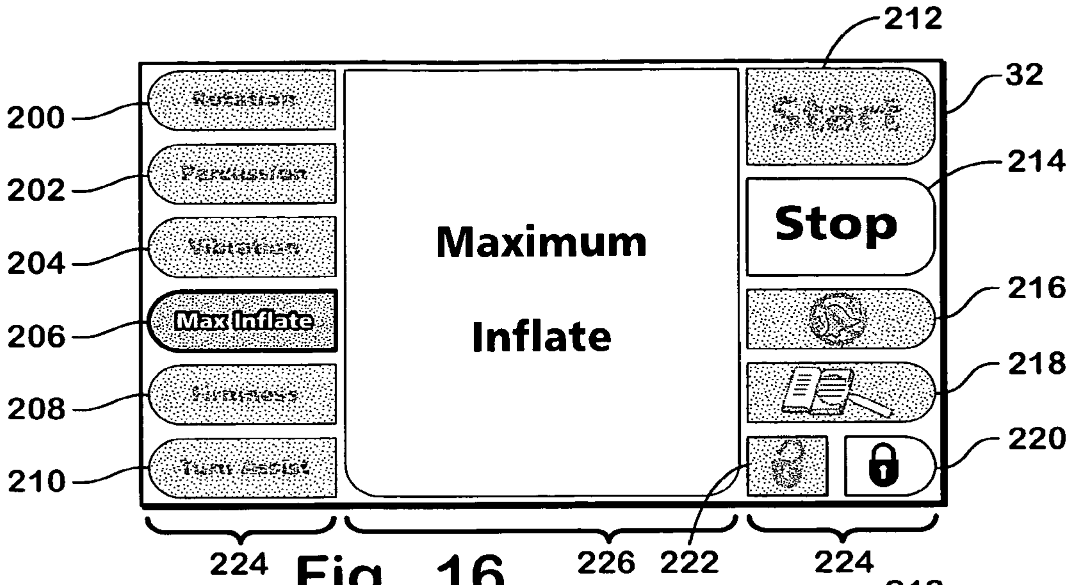
FIG. 16 is a view of the touch-screen display illustrating multiple functions and displaying a visual indicator that a maximum inflate function is operating.
Figure 17:
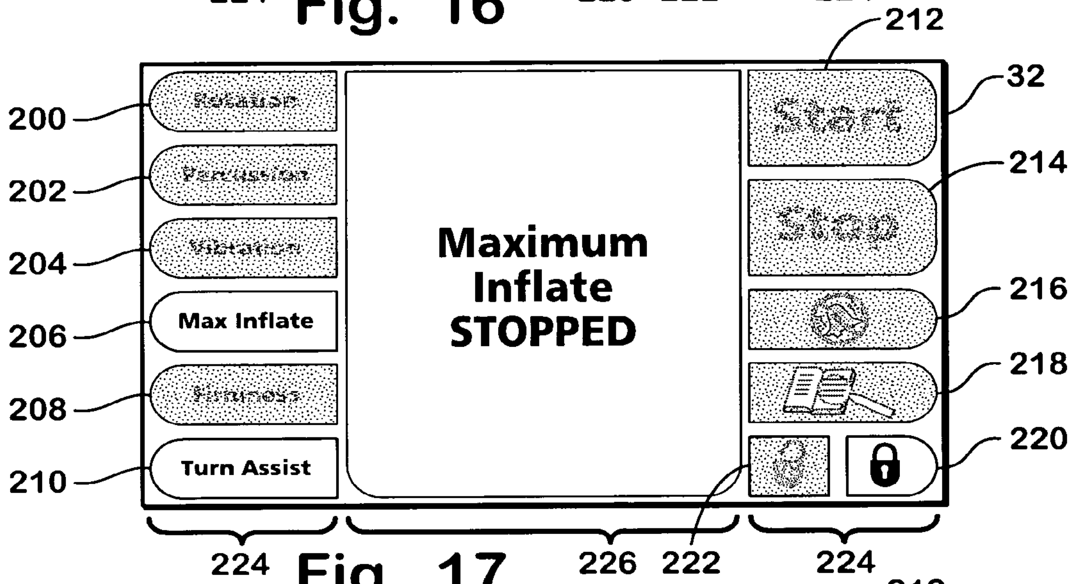
FIG. 17 is a view of the touch-screen display illustrating multiple functions and displaying a visual indicator that the maximum inflate function has stopped.
Figure 18:
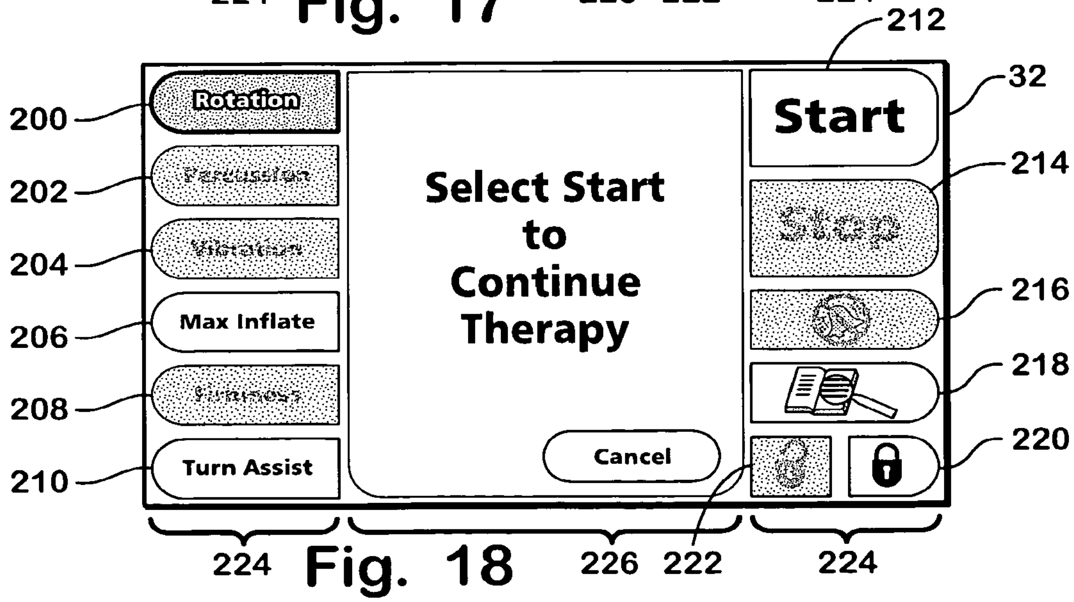
FIG. 18 is a view of the touch-screen display illustrating multiple functions and displaying a visual indicator that prompts the operator to continue a previous therapeutic function after the maximum inflate function has stopped.

FIG. 16 shows the touch-screen display 32 after selecting the max inflate button 206. If any of the therapeutic functions are operating when the max inflate button 206 is selected, they are paused. As shown, by selecting the max inflate button 206, the main control system 70 instructs the firmness setting device 84 to inflate the main air bladder 36 to the maximum pressure. This is represented on the touch-screen display 32 by a visual indicator. During the maximum inflation function, referring to FIG. 17, the operator can stop inflation and the touch-screen display 32 will indicate that inflation has stopped. The maximum inflation function will also stop automatically after 30 minutes and give a visual indication (not shown) and an audible alarm that the maximum inflation function is complete. Once finished or stopped, referring to FIG. 18, the display software, via the touch-screen display 32, prompts the operator to continue therapy, in the event that one of the therapeutic functions, e.g., rotation, was paused to perform the maximum inflation function.

Figure 19:
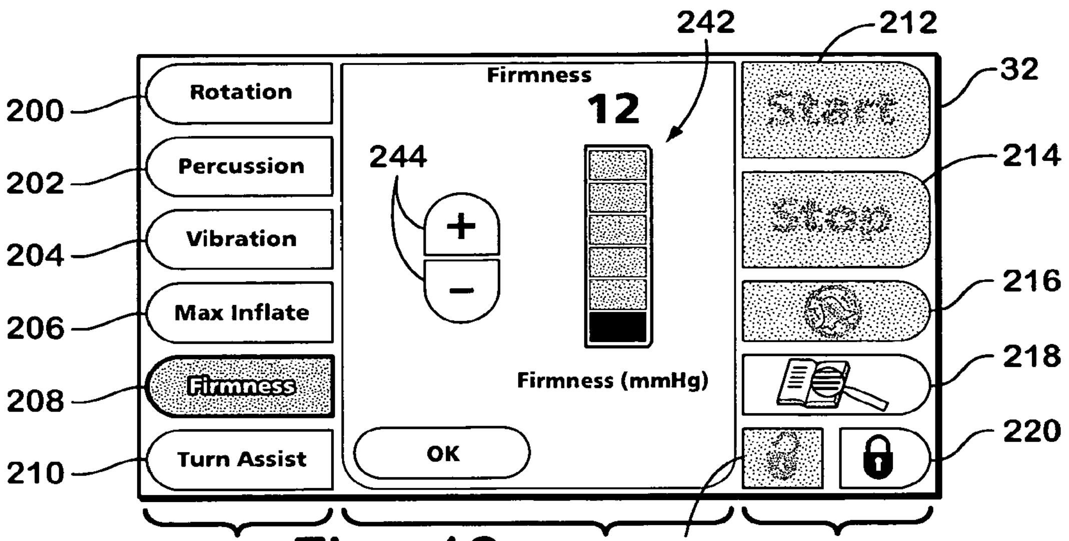
FIG. 19 is a view of the touch-screen display illustrating multiple functions and displaying an adjustable operating parameter of a firmness setting function.

FIG. 19 shows the touch-screen display 32 after selecting the firmness button 208. As shown, by selecting the firmness button 208, the data window portion 226 now displays an adjustable operating parameter 242 corresponding to the firmness setting function. Here, the adjustable operating parameter 242 is a firmness level in millimeters of mercury (mmHg). The operator can adjust the firmness level using touch selectable adjustment buttons 244. Once the firmness level is set, the main control system 70 instructs the firmness setting device 84, i.e., the main valve system 58 and main air bladder 36, to adjust the firmness of the main air bladder 36 accordingly. A pressure sensor (not shown) is plumbed to the main air bladder 36 and in operative communication with the controller 72 to provide closed-loop pressure control and meet the selected firmness level.

Figure 20:
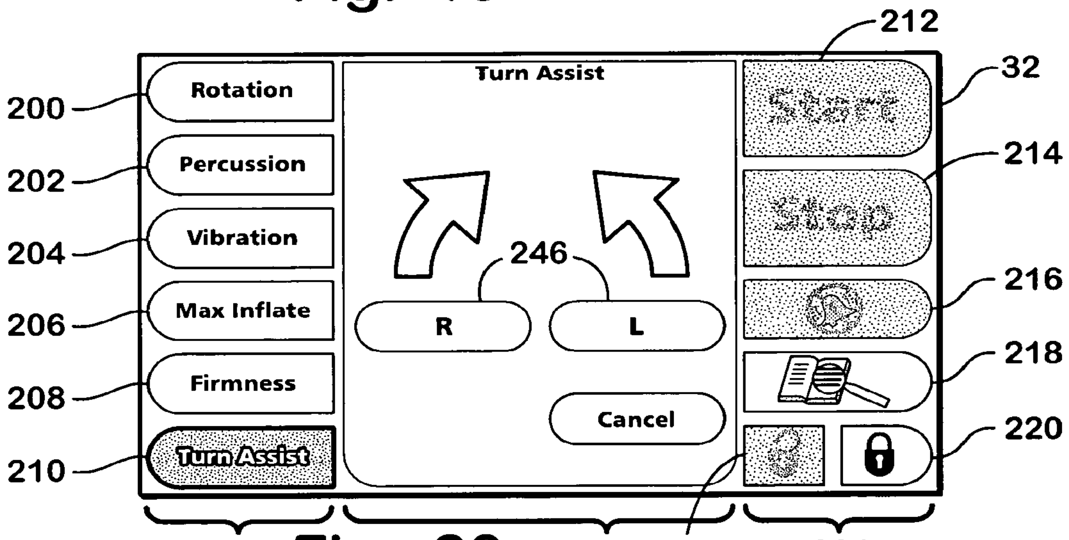
FIG. 20 is a view of the touch-screen display illustrating multiple functions and displaying options for a patient turning function.
Figure 21:
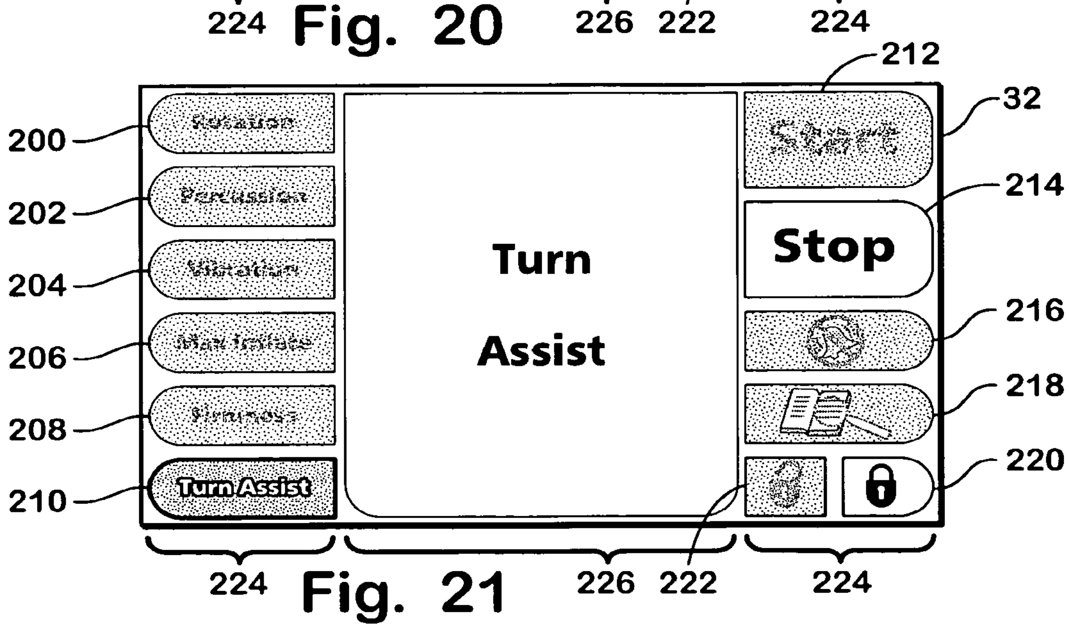
FIG. 21 is a view of the touch-screen display illustrating multiple functions and displaying a visual indicator that the patient turning function is operating.
Figure 22:
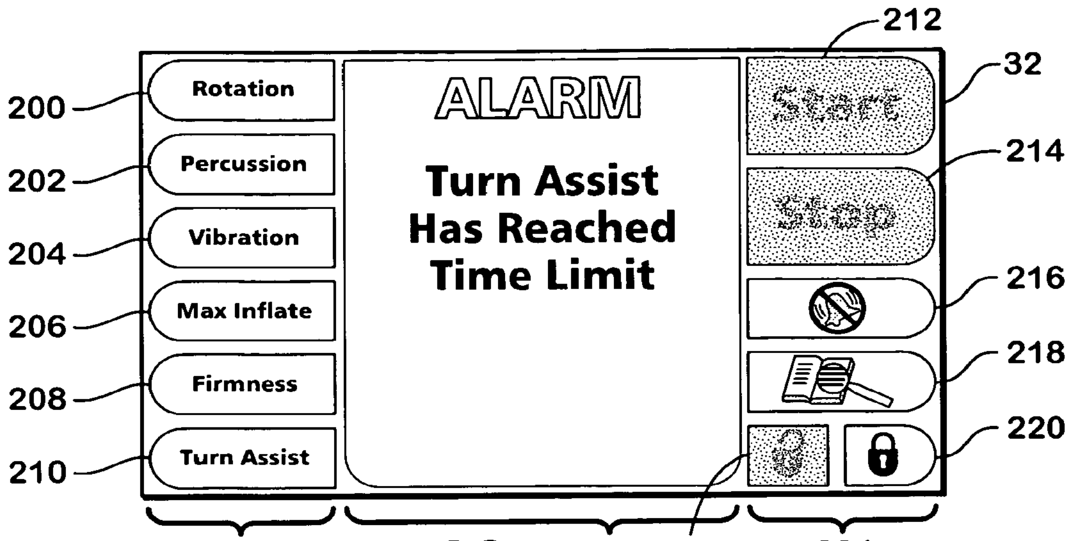
FIG. 22 is a view of the touch-screen display illustrating multiple functions and displaying a visual indicator and alarm that the patient turning function has reached a predetermined time limit.
Figure 23:
FIG. 23 is a view of the touch-screen display illustrating multiple functions and displaying a visual indicator that prompts the operator to continue a previous therapeutic function after the patient turning function has stopped.

FIG. 20 shows the touch-screen display 32 after selecting the turn assist button 210. If any of the therapeutic functions are operating when the turn assist button 210 is selected, they are paused. Here, the display software provides the option of turning the patient to the left side or the right side via corresponding touch selectable buttons 246. Once a side is selected, referring to FIG. 21, the patient turning function begins. The patient turning function is an operation of the rotation device 88. In other words, when turn assist is operating, the main control system 70 instructs the rotation device 88 to turn the patient accordingly. The patient turning function lasts for 30 minutes unless otherwise stopped earlier. After which time, referring to FIG. 22, a visual indicator is presented and an alarm sounds indicating that the turn assist time limit has been reached. Once finished or stopped, referring to FIG. 23, the display software, via the touch-screen display 32, prompts the operator to continue therapy, in the event that one of the therapeutic functions, e.g., rotation, was paused to perform the patient turning function.

Figure 24A:
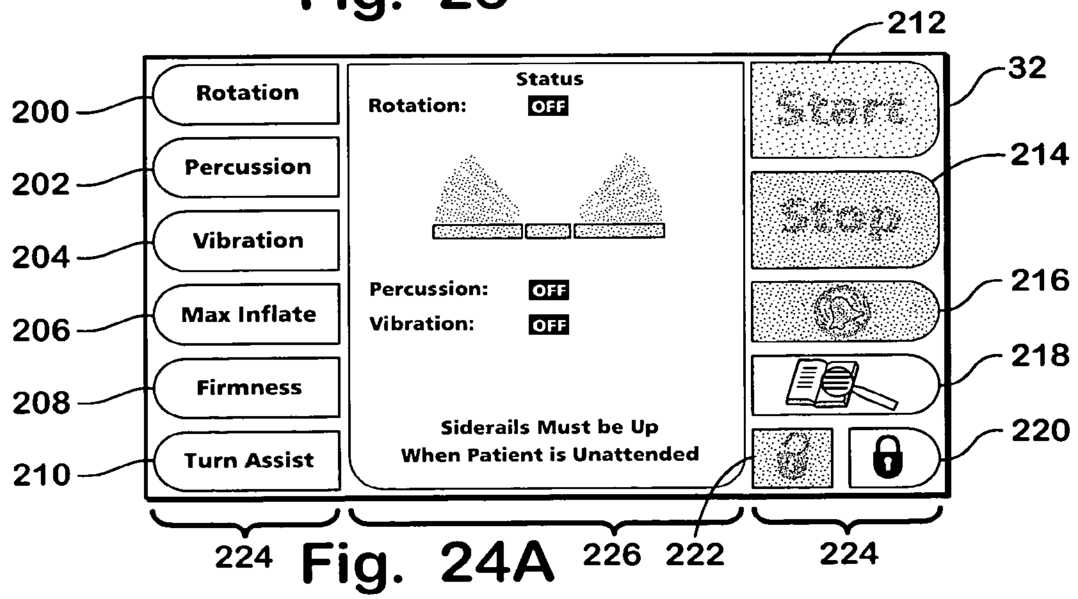
FIG. 24A is a view of the touch-screen display illustrating multiple functions and displaying an unlocked condition of the touch-screen display.
Figure 24B:
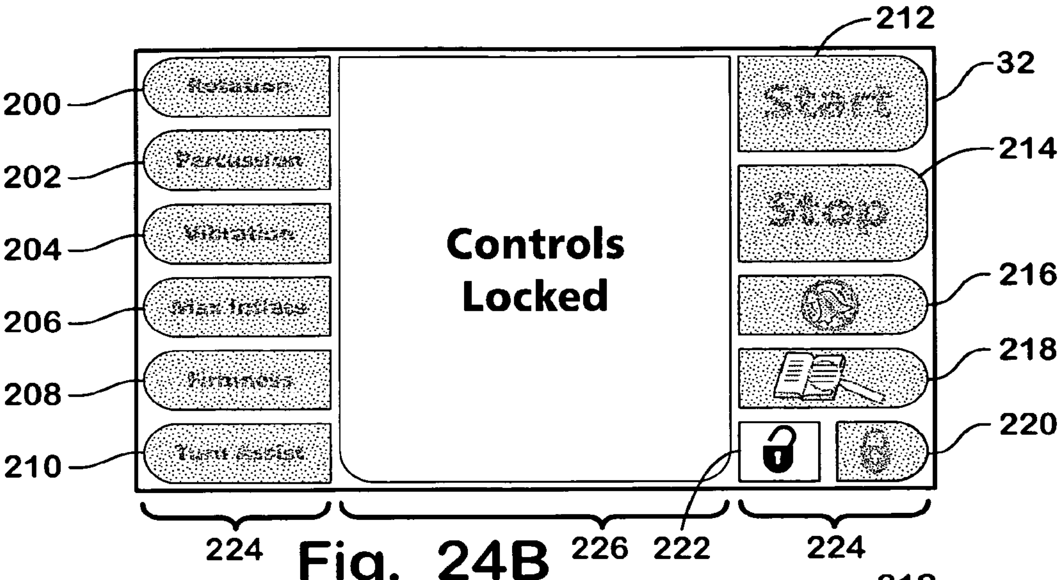
FIG. 24B is a view of the touch-screen display illustrating multiple functions and displaying a locked condition of the touch-screen display.

FIGS. 24A and 24B show the touch-screen display 32 between unlocked and locked states, respectively. The touch selectable lock 220 and unlock 222 buttons are in the form of locked and unlocked padlock icons and are used to switch between the locked and unlocked states. In the locked state, shown in FIG. 24B, all controls are locked, except that if one of the therapeutic functions is operating, the stop button 214 is always accessible. Likewise, the touch selectable alarm silence button 216 in the form of an icon of an alarm inside a prohibitory sign is accessible in the event of an alarm. In the unlocked state, shown in FIG. 24A, operation continues as normal.

Figure 25:
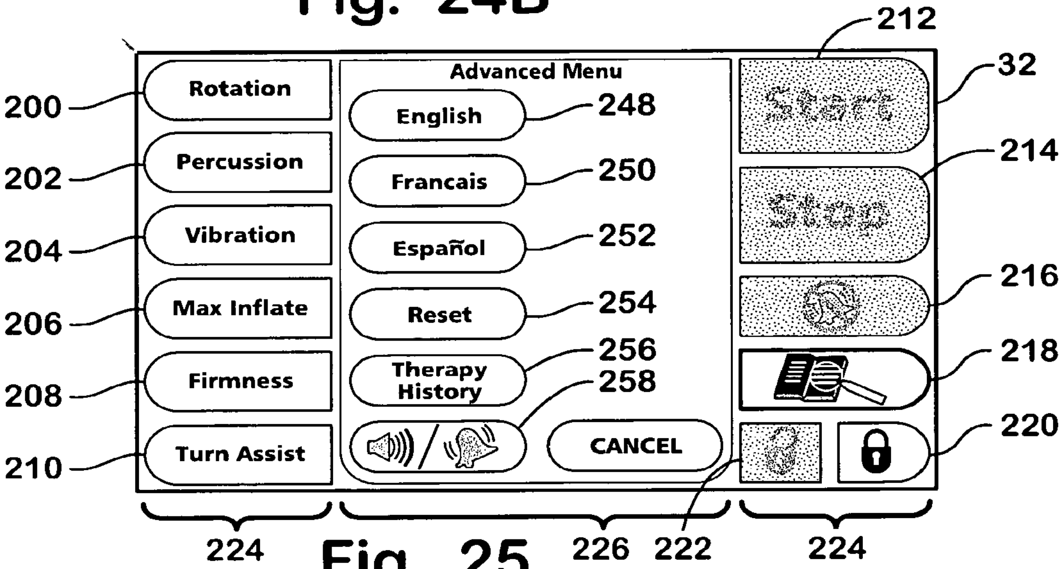
FIG. 25 is a view of the touch-screen display illustrating multiple functions and displaying an advanced menu.
Figure 26:
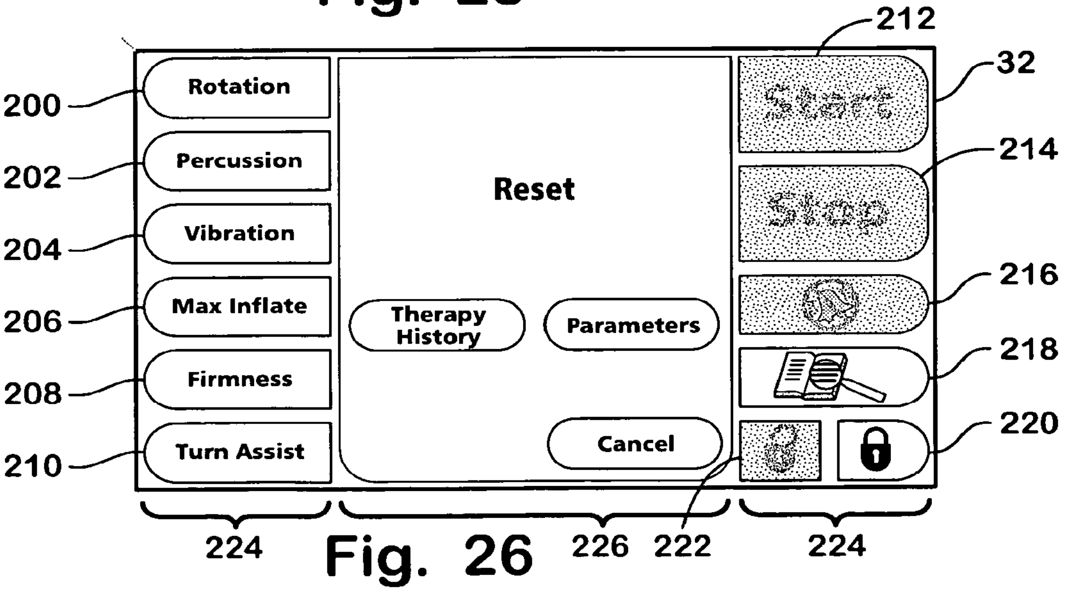
FIG. 26 is a view of the touch-screen display illustrating multiple functions and displaying a reset function of the advanced menu.

FIG. 25 shows the touch-screen display 32 after selecting the advanced menu button 218. By selecting the advanced menu button 218, as shown, the advanced functions are displayed for selection. The advanced functions include selecting between multiple display languages, a reset function, a therapy history function, and an alarm preferences function. When any of the touch selectable buttons corresponding to the various languages are selected, the display automatically switches the display language accordingly. With reference to FIG. 26, when a touch selectable button 254 corresponding to the reset function is selected, the display software prompts the operator to select the therapy history for resetting or the adjustable operating parameters for resetting to default settings.

Figure 27:
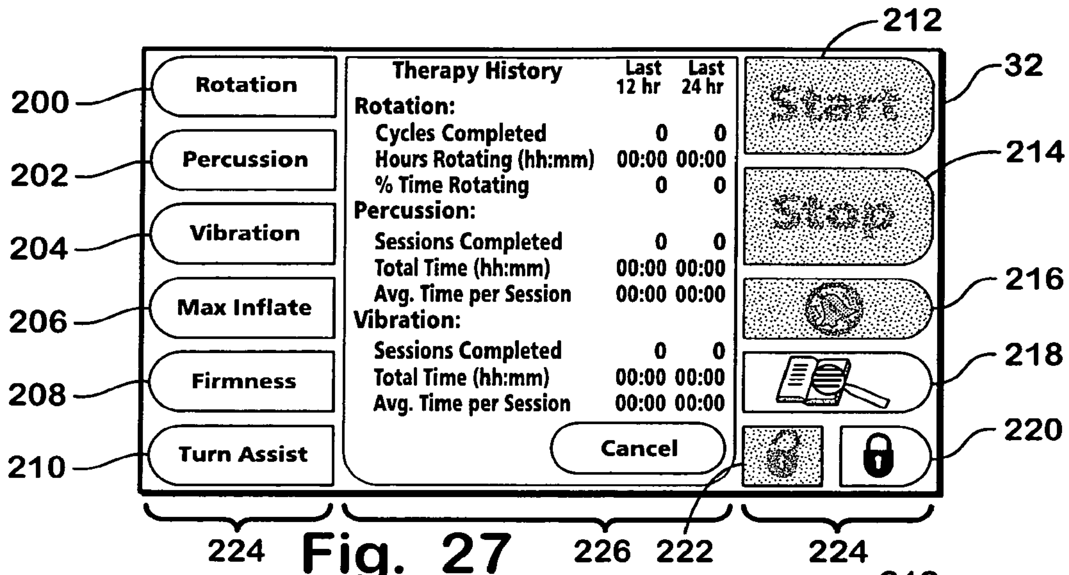
FIG. 27 is a view of the touch-screen display illustrating multiple functions and displaying a therapy history function from the advanced menu.
Figure 28:
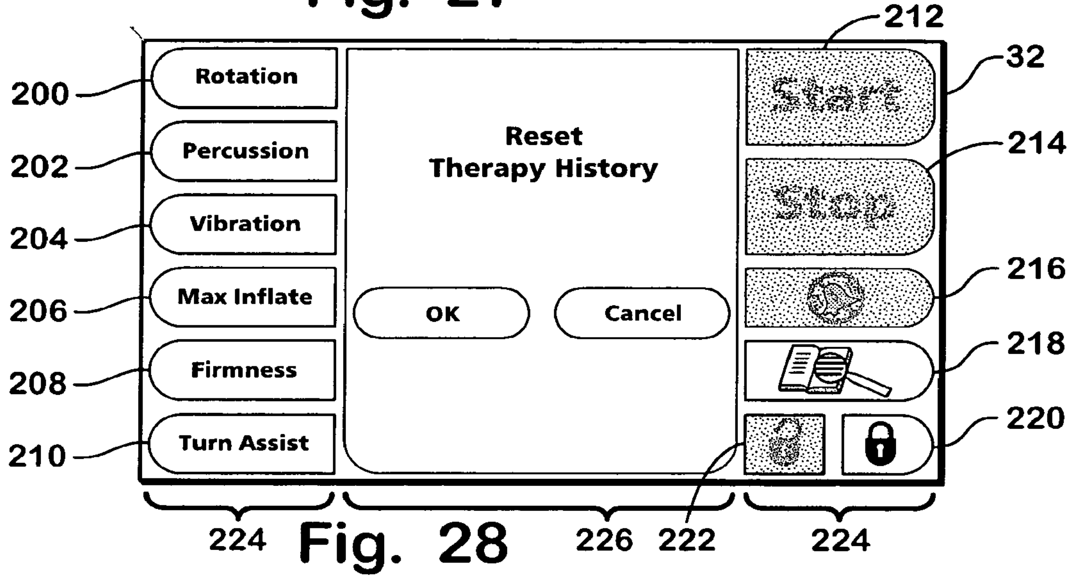
FIG. 28 is a view of the touch-screen display illustrating multiple functions and prompting an operator to reset a therapy history of the patient support apparatus.
Figure 29:
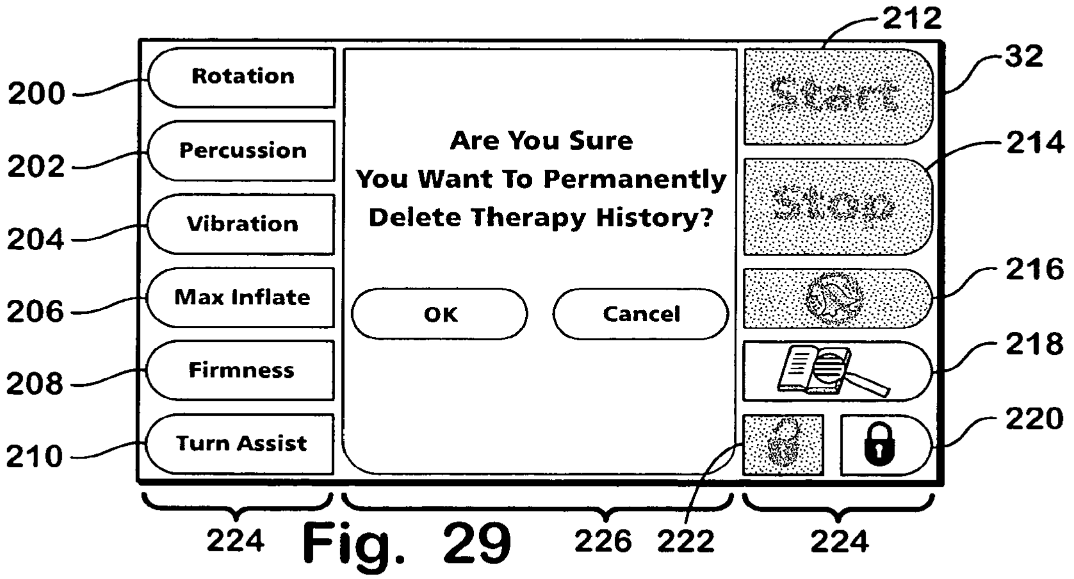
FIG. 29 is a view of the touch-screen display illustrating multiple functions and prompting the operator to permanently delete the therapy history.

FIG. 27 shows the touch-screen display 32 after selecting a touch selectable button 256 corresponding to the therapy history function. After selecting the therapy history button 256, the therapy history of the patient support apparatus 10 is displayed for a predetermined time, preferably 30 to 90 seconds, most preferably 60 seconds. The therapy history is formatted in predetermined time increments, such as rolling 12-hour and 24-hour increments, and displays a history of the operation of each of the therapeutic functions of the patient support apparatus 10 including rotation cycles completed during rotation therapy, hours rotating, % time rotating, number of percussion therapy sessions, total percussion therapy time, average time per percussion therapy session, number of vibration therapy sessions, total vibration therapy time, and average time per vibration therapy session. Of course, other therapy parameters such as average intensity level for percussion and vibration therapy, average rotation angles employed during rotation therapy, and the like, could also be displayed. The main control system 70 tracks or logs the therapeutic functions as they are selected for operation. In essence, the commands sent to the controller 72 via the touch-screen display 32 are logged or stored in a retrievable electronic storage format in the controller 72 for later access via the therapy history function. FIGS. 28 and 29 shows the touch-screen display 32 immediately after start-up of the patient support apparatus 10, i.e., after power is plugged into the patient support apparatus 10. Here, the operator has the option of resetting the therapy history and restarting the rolling log of therapy conducted.

Figure 30:
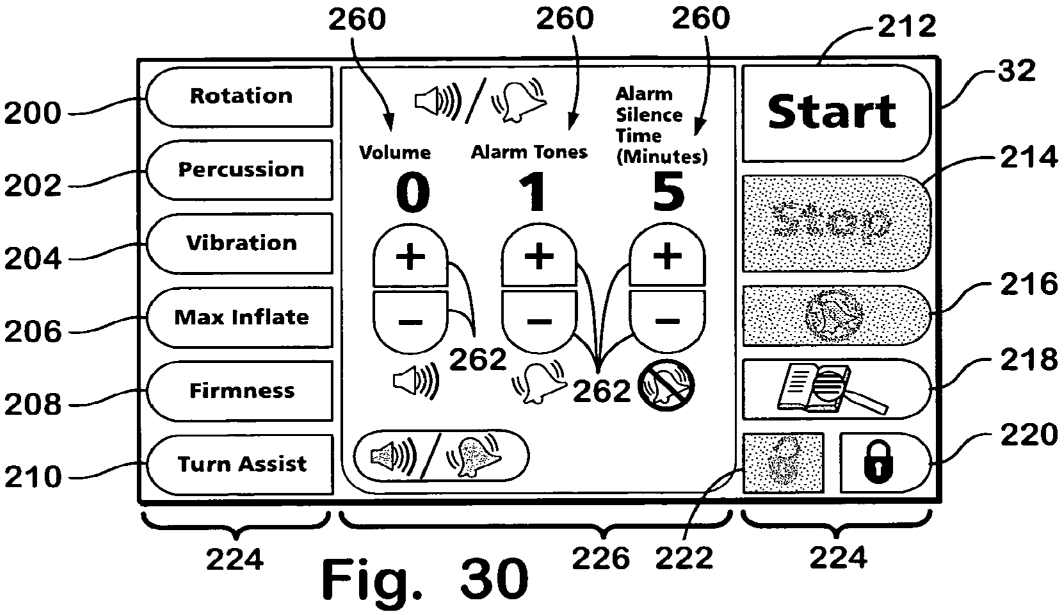
FIG. 30 is a view of the touch-screen display illustrating multiple functions and displaying a alarm setting function from the advanced menu.

FIG. 30 shows the touch-screen display 32 after selecting a touch selectable button 258 corresponding to the alarm preferences function. By selecting the alarm preferences button 258, the data window portion 226 displays a plurality of adjustable parameters 260 related to alarm volume, a plurality of different alarm types or tones, and an alarm silence time when the alarm silence button 216 is selected after an alarm has been initiated. These parameters 260 can be adjusted by touch selectable adjustment buttons 262. The different alarm types or tones is particularly useful in a hospital room environment, particularly an emergency room, when other systems not associated with the patient support apparatus 10 also have alarms responding to various actions. For instance, one alarm may indicate a loss of blood pressure of the patient, while another alarm may indicate that the patient is attempting to exit the hospital bed. In these instances, the operator can adjust the alarm type to clearly distinguish the alarm associated with the patient support apparatus 10 from other alarms.

Figure 31A:
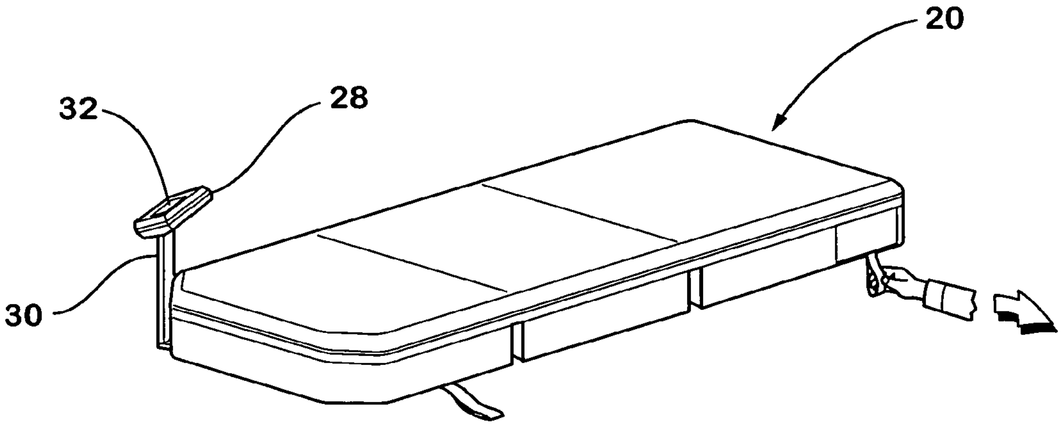
FIG. 31A is a perspective view of the mattress of the present invention illustrating the pulling of a CPR plug from the mattress.
Figure 31B:
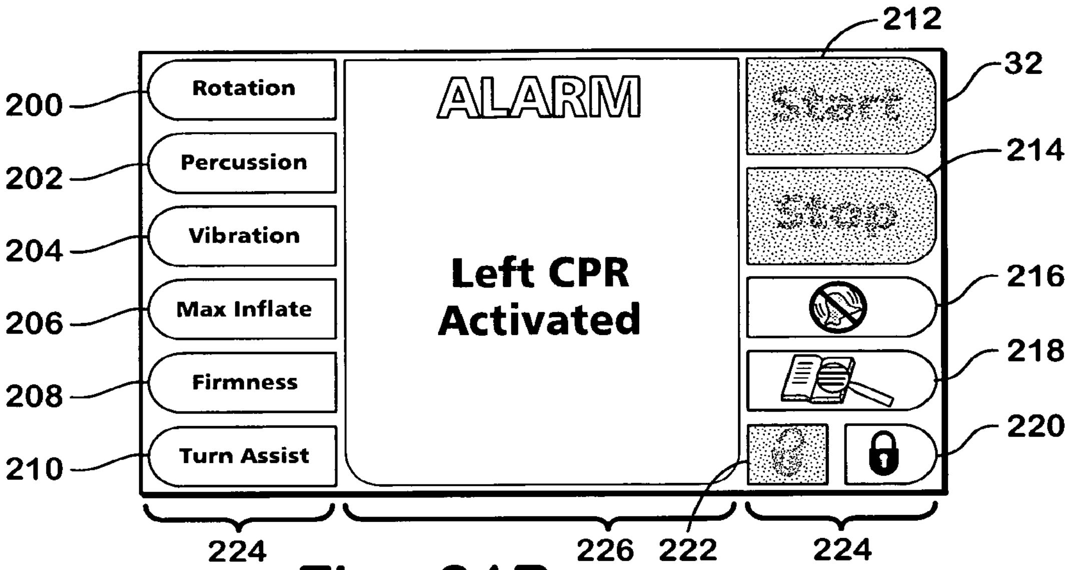
FIG. 31B is a view of the touch-screen display immediately after pulling the CPR plug in which a visual indicator of the same is shown as well as an alarm.
Figure 31C:
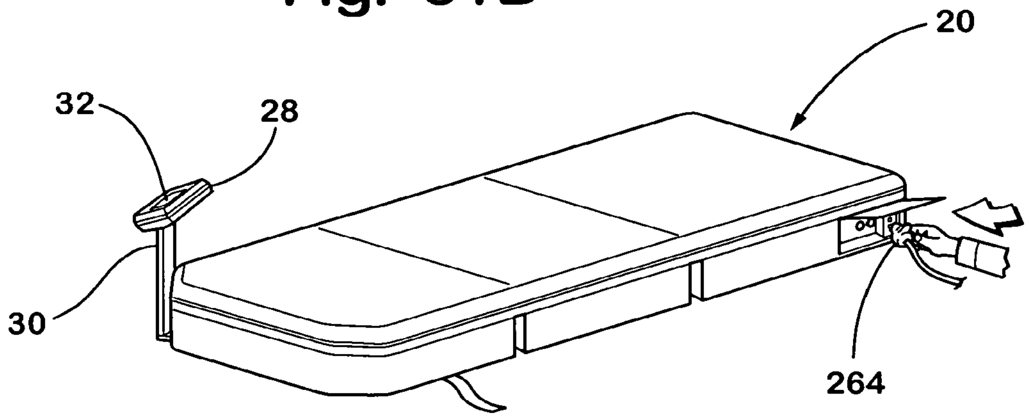
FIG. 31C is a perspective view of the mattress of the present invention illustrating the replacement of the CPR plug back into the mattress.

Referring to FIGS. 31A-31C, the patient support apparatus 10 is also equipped with left and right side CPR plugs 264. When one or more of the CPR plugs 264 are pulled, all operating functions cease and, referring to FIG. 32B, an alarm sounds and a visual indication that the CPR plug 264 has been pulled is presented. Referring to FIG. 31C, the alarm is deactivated and all operating functions resume when the CPR plug 264 is replaced. A description of the operation of the CPR plugs 264 and an associated CPR dump mechanism is found in the '078 publication to Flick et al., herein incorporated by reference.

Figure 32:
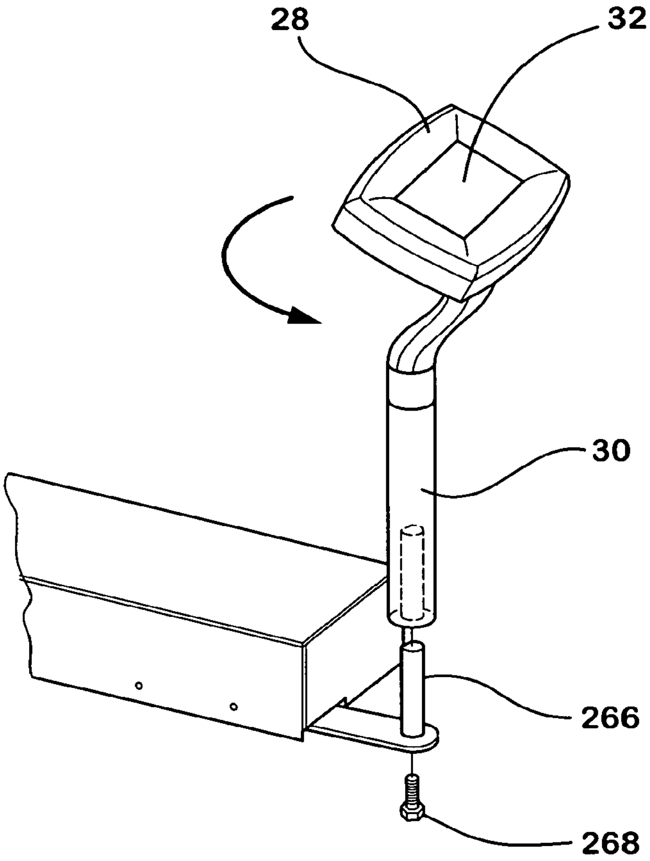
FIG. 32 is a perspective view of a pendant and tower of the present invention illustrating rotation of the pendant and tower.

Referring to FIG. 32, the pendant 28 and tower 30 may be rotatably mounted to the mattress 20 by an adjustment mechanism. More specifically, a mounting bracket extends from the first control unit 46 with the adjustment mechanism having a post 266 fastened thereto by a fastener 268. The adjustment mechanism further includes an elongated cavity disposed in a bottom end of the tower 30 for being rotatably seated on the post 266. The adjustment mechanism provides for rotation about a vertical axis. However, in alternative embodiments, other adjustment mechanisms may provide for rotation of the pendant 28 relative to the tower 30 about a horizontal axis. A set screw or other locking mechanism could be used to lock the tower 30 to the post 266 to prevent rotation once the tower 30 is placed in a desired rotational position relative to the post 266, as will be appreciated by those skilled in the art.

Obviously, many modifications and variations of the present invention are possible in light of the above teachings. The invention may be practiced otherwise than as specifically described within the scope of the appended claims.

What is claimed is:

1. A patient support apparatus comprising:

a mattress having a plurality of inflatable bladders and a plurality of devices for carrying out a plurality of functions at said mattress, said functions including (i) adjusting the firmness of the mattress to provide a firmness function, and (ii) a therapeutic treatment of a patient supported on said mattress, said therapeutic treatment including moving a patient relative to at least a portion of said mattress;

a control system in operative communication with said plurality of devices for controlling said devices and for operating on at least one of said inflatable bladders;

said control system including a touch-screen display including a menu portion and an active window portion, said menu portion having a plurality of touch selectable buttons, at least one of said touch selectable buttons associated with said therapeutic treatment, said control system displaying a dynamic icon representative of a parameter associated with said therapeutic treatment and displaying at said active window portion at least one touch selectable parameter button operable to modify the therapeutic treatment, and said control system changing the dynamic icon in response to a change in the parameter wherein the operator is provided visual feedback on their selection of the therapeutic treatment and on a change to the parameter of the therapeutic treatment; and said menu portion being displayed and remaining visible on said touch-screen display after a user selects at least one of said touch selectable buttons and with the functions of said touch selectable buttons maintaining their associations with their respective touch selectable buttons such that an operator can easily select between each of said touch selectable buttons of said menu portion and their corresponding functions.

2. A patient support apparatus as set forth in claim 1 wherein said therapeutic treatment includes a turning function of a patient relative to at least a portion of said mattress.

3. A patient support apparatus as set forth in claim 2 wherein said plurality of devices include a rotation device for turning a patient relative to at least a portion of said mattress for carrying out said rotation function.

4. A patient support apparatus as set forth in claim 2 wherein said touch selectable parameter button is configured to select between a left turn and a right turn relative to a portion of said mattress.

5. A patient support apparatus as set forth in claim 4 wherein said control system generates an icon representative of said turning function.

6. A patient support apparatus as set forth in claim 1 wherein said touch-screen display further includes a second touch selectable button associated with said firmness function and a second dynamic icon associated with said firmness function, said second touch selectable button operable to select said firmness function, and said second dynamic icon changing in response to a change of a parameter associated with said firmness function.

7. A patient support apparatus as set forth in claim 6 wherein said second dynamic icon indicates the level of firmness.

8. A support apparatus as set forth in claim 7 wherein said second dynamic icon includes a plurality of bars, said bars changing in response to a user adjusting the firmness level.

9. A patient support apparatus as set forth in claim 1 wherein said touch-screen display further includes a second touch selectable button corresponding to a maximum inflation function, and said control system is configured to automatically inflate said bladders to a maximum pressure upon operator selection of said touch selectable button.

10. A patient support apparatus as set forth in claim 9 wherein said active window portion includes a pair of said touch selectable parameter buttons, said touch selectable parameter buttons corresponding to a left turn and a right turn of a patient.

11. A patient support apparatus as set forth in claim 1 wherein said display displays words at said menu portion and/or active window portion, said display further including a touch selectable button corresponding to a language function to select between a plurality of languages, and when a language is selected said control system changing the words from a first language to the selected language when the selected language is different than the first language.

12. A patient support apparatus as set for in claim 11 wherein said touch-screen display further includes a second touch selectable button associated with said firmness function for controlling said firmness setting function.

13. A patient support apparatus as set forth in claim 12 wherein said second touch selectable button provides a maximum inflation function, and said control system being configured to automatically inflate said bladders to a maximum pressure upon operator selection thereof.

14. A patient support apparatus as set forth in claim 13 wherein said display includes a history touch selectable button to display patient history, when selected said control system displaying history of said patient at said display.

* * * * *